US012755919B2

(12) United States Patent
Rhein et al.

(10) Patent No.: US 12,755,919 B2
(45) Date of Patent: Oct. 6, 2026

(54) COMPACT RECLOSER

(71) Applicant: Hubbell Incorporated, Shelton, CT (US)

(72) Inventors: David A. Rhein, Birmingham, AL (US); Robert B. Hinshaw, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 297 days.

(21) Appl. No.: 18/201,589

(22) Filed: May 24, 2023

(65) Prior Publication Data

US 2023/0386775 A1 Nov. 30, 2023

Related U.S. Application Data

(60) Provisional application No. 63/353,187, filed on Jun. 17, 2022, provisional application No. 63/349,512, filed on Jun. 6, 2022, provisional application No. 63/345,938, filed on May 26, 2022.

(51) Int. Cl.

| | |
|---|---|
| ***H01H 75/04*** | (2006.01) |
| ***H01H 9/16*** | (2006.01) |
| ***H01H 11/00*** | (2006.01) |
| ***H01H 71/12*** | (2006.01) |

(52) U.S. Cl.

CPC ............ *H01H 75/04* (2013.01); *H01H 9/167* (2013.01); *H01H 11/0062* (2013.01); *H01H 71/123* (2013.01)

(58) Field of Classification Search

CPC .... H01H 75/04; H01H 9/167; H01H 11/0062; H01H 71/123

USPC .......................................................... 337/169

See application file for complete search history.

(56) References Cited

U.S. PATENT DOCUMENTS

| | | | | | |
|---|---|---|---|---|---|
| 3,622,932 | A * | 11/1971 | Cunavelis | H01H 37/08 | 337/79 |
| 3,720,899 | A * | 3/1973 | Hire | H01H 37/08 | 337/348 |
| 4,048,607 | A * | 9/1977 | Smorzaniuk | H01H 73/50 | 335/23 |

(Continued)

OTHER PUBLICATIONS

PCT/US2023/023404 International Search Report and Written Opinion dated Sep. 25, 2023 (17 pages).

*Primary Examiner* — Anatoly Vortman

(74) *Attorney, Agent, or Firm* — Michael Best & Friedrich LLP

(57) ABSTRACT

A recloser including a circuit interrupter including a first contact and a second contact movable relative to the first contact between a closed position and an open position and an actuator coupled to the circuit interrupter, the actuator including a plunger coupled to the second contact for closing and opening the circuit interrupter and a single coil used for driving the plunger. The recloser further includes a sensor board supported by the actuator, the sensor board including a plurality of position sensors for detecting a position of the plunger, an external indicator for indicating a condition of the circuit interrupter, the external indicator including a first display portion that indicates the closed position and a second display portion moveable relative to the first display portion and that indicates the open position, and a handle for mechanically opening and closing the circuit interrupter without any electrical assistance.

9 Claims, 28 Drawing Sheets

(56) References Cited

U.S. PATENT DOCUMENTS

| | | | | | |
|---|---|---|---|---|---|
| 4,363,016 | A * | 12/1982 | Unger | H01H 73/26 | 337/91 |
| 4,833,439 | A * | 5/1989 | Bowden | H01H 73/26 | 337/91 |
| 4,868,535 | A * | 9/1989 | Janniere | H01H 71/46 | 337/91 |
| 5,004,994 | A * | 4/1991 | Korczynski | H01H 73/28 | 337/68 |
| 5,260,679 | A * | 11/1993 | Viscogliosi | H01H 85/306 | 337/267 |
| 5,319,344 | A * | 6/1994 | Mosesian | H01H 85/303 | 337/267 |
| 5,541,569 | A * | 7/1996 | Jang | H01H 73/303 | 337/79 |
| 5,786,743 | A * | 7/1998 | Viscogliosi | H01H 85/306 | 337/267 |
| 6,522,228 | B2 * | 2/2003 | Wellner | H01H 73/56 | 200/317 |
| 6,671,145 | B2 * | 12/2003 | Germain | H01H 83/04 | 361/45 |
| 6,714,116 | B1 * | 3/2004 | Sang | H01H 73/26 | 200/341 |
| 6,741,157 | B2 * | 5/2004 | Chen | H01H 73/26 | 337/56 |
| 6,759,939 | B2 * | 7/2004 | Sudan | H01H 11/0031 | 337/284 |
| 7,268,660 | B2 * | 9/2007 | Bolda | H01M 10/42 | 337/140 |
| 7,382,223 | B2 * | 6/2008 | Krishnamurthy | H01H 73/24 | 337/72 |
| 7,400,477 | B2 * | 7/2008 | Campolo | H01H 71/62 | 335/26 |
| 7,405,645 | B2 * | 7/2008 | Fontaine | H01H 77/04 | 337/72 |
| 7,570,146 | B2 * | 8/2009 | Mills | H01H 71/04 | 337/79 |
| 7,639,112 | B2 * | 12/2009 | Nicoletti, III | H01H 9/10 | 337/167 |
| 8,830,015 | B2 * | 9/2014 | Padro | H01H 83/144 | 361/42 |
| 9,583,297 | B2 * | 2/2017 | Benke | F16C 1/10 | |
| 2008/0170341 | A1 | 7/2008 | Huadao et al. | | |
| 2008/0186642 | A1 | 8/2008 | Campolo | | |
| 2010/0259347 | A1 | 10/2010 | Ziegler et al. | | |
| 2014/0014483 | A1 * | 1/2014 | Gottschalk | H01H 71/04 | 200/308 |
| 2016/0358733 | A1 | 12/2016 | Chen | | |
| 2016/0372289 | A1 * | 12/2016 | Darr | H01H 9/104 | |

* cited by examiner

COMPACT RECLOSER

RELATED APPLICATIONS

The present application claims priority to U.S. Provisional Application No. 63/345,938, filed on May 26, 2022, U.S. Provisional Application No. 63,349,512, filed on Jun. 6, 2022, and U.S. Provisional Application No. 63/353,187, filed Jun. 17, 2022, the entire contents of all of which are hereby incorporated.

FIELD

The present disclosure relates generally to circuit interrupting devices, such as reclosers.

SUMMARY

A first aspect of the present disclosure provides a recloser including a circuit interrupter having a first contact and a second contact movable relative to the first contact between a closed position and an open position and an actuator coupled to the circuit interrupter, the actuator including a plunger coupled to the second contact for closing and opening the circuit interrupter and a single coil used for driving the plunger. The recloser further includes a sensor board supported by the actuator, the sensor board including a plurality of position sensors for detecting a position of the plunger, an external indicator for indicating a condition of the circuit interrupter, the external indicator including a first display portion that indicates the closed position and a second display portion moveable relative to the first display portion and that indicates the open position, and a handle for mechanically opening and closing the circuit interrupter without any electrical assistance.

Another aspect of the present disclosure provides a recloser including a circuit interrupter having a first contact and a second contact movable relative to the first contact between a closed position, which allows current to pass through the circuit interrupter, and an open position, which separates the contacts and prevents current from passing through the circuit interrupter and an actuator coupled to the circuit interrupter, the actuator including a plunger coupled to the second contact for closing and opening the circuit interrupter. The recloser further includes an external indicator for indicating a condition of the circuit interrupter, the external indicator including a first display portion that indicates the closed position and a second display portion moveable relative to the first display portion and that indicates the open position and a linkage assembly coupled between the second display portion and the plunger, the linkage assembly forcing the second display portion to extend out of the recloser when the plunger opens the circuit interrupter and forcing the second display portion to retract into the recloser when plunger closes the circuit interrupter.

Another aspect of the present disclosure provides a recloser including a circuit interrupter having a first contact and a second contact movable relative to the first contact between a closed position, which allows current to pass through the circuit interrupter, and an open position, which separates the contacts and prevents current from passing through the circuit interrupter and an actuator coupled to the circuit interrupter, the actuator including a plunger coupled to the second contact for closing and opening the circuit interrupter. The recloser further includes a handle for mechanically opening and closing the circuit interrupter without any electrical assistance a linkage assembly coupled between the handle and the plunger for effecting movement of the plunger when the handle is rotated.

Another aspect of the present disclosure provides a recloser assembly for use with a power distribution system. The recloser assembly includes a recloser that has a first terminal and a second terminal. The first terminal includes a contact rod that extends outward from the recloser in a first direction and a contact head coupled to the contact rod, the contact head extending in second direction. The recloser assembly further includes a cutout that has a first coupling mechanism configured to electrically and mechanically connect to the first terminal and a second coupling mechanism configured to electrically and mechanically connect to the second terminal. The first coupling mechanism includes a conductive frame that defines an opening configured to receive the contact head and a jaw rotatably coupled within the opening and configured to latch onto the contact head when the contact head is inserted in the opening.

Another aspect of the present disclosure provides a recloser for use in a power distribution system. The recloser includes a circuit interrupter having a first contact and a second contact movable relative to the first contact between a closed position, which allows current to pass through the circuit interrupter, and an open position, which separates the contacts and prevents current from passing through the circuit interrupter and an actuator coupled to the circuit interrupter. The actuator includes a magnetic frame that defines a first space and a second space, a plastic bobbin assembly coupled to the magnetic frame, and a plunger coupled to the second contact and operable to move within the magnetic frame to open and close the circuit interrupter. The actuator further includes a single coil wound around the plastic bobbin assembly, the single coil configured to generate a magnetic field for driving the plunger when the single coil is excited with current provided by the power distribution system.

Another aspect of the present disclosure provides a recloser including a circuit interrupter having a first contact and a second contact movable relative to the first contact between a closed position, which allows current to pass through the circuit interrupter, and an open position, which separates the contacts and prevents current from passing through the circuit interrupter and an actuator coupled to said circuit interrupter, the actuator including a plunger coupled to the second contact for closing and opening the circuit interrupter. The recloser further includes a sensor board having a first position sensor and a second position sensor, the first and second position sensors configured to generate signals indicative of a position of the plunger, and a controller including an electronic processor and communicatively coupled to the actuator and the sensor board. The controller is configured to determine a velocity of the plunger based on a first signal generated by the first position sensor and a second signal generated by the second position sensor.

Another aspect of the present disclosure provides a method of detecting contact erosion in a recloser that includes a circuit interrupter including a first contact and a second contact movable relative to the first contact between a closed position and an open position, an actuator including a plunger that is coupled to the second contact for closing and opening the circuit interrupter, a sensor board including a plurality of position sensors for detecting a position of the plunger, and a controller including an electronic processor operatively coupled to the actuator and the sensor board. The method includes receiving, by the controller, a first signal from a first position sensor, determining, by the controller, a first time at which the plunger moves past the first position sensor based on a voltage change in the first signal, receiving, by the controller, a second signal from a second position sensor, determining, by the controller, a second time at which the plunger moves past the second position sensor based on a voltage change in the second signal, and determining, by the controller, a velocity of the plunger based on a difference between the first and second times and a lateral distance between the first and second optical sensors. The method further includes determining, by the controller, whether a difference between the velocity of the plunger and a baseline velocity of the plunger exceeds a threshold and performing, by the controller, an operating action when the difference between the velocity of the plunger and the baseline velocity exceeds a threshold.

Another aspect of the present disclosure provides a method of detecting contact erosion in a recloser that includes a circuit interrupter including a first contact and a second contact movable relative to the first contact between a closed position and an open position, an actuator including a plunger that is coupled to the second contact for closing and opening the circuit interrupter, an position sensor for detecting a position of the plunger, a current sensor for detecting a current flowing through the circuit interrupter, and a controller including an electronic processor operatively coupled to the actuator and the sensor board. The method includes receiving, by the controller, a first signal from the position sensor, determining, by the controller, a first time at which the plunger moves past the position sensor based on a voltage change in the first signal, receiving, by the controller, a second signal from the current sensor, and determining, by the controller, a second time at which current begins to flow through the circuit interrupter based on the second signal. The method further includes determining, by the controller, whether a difference between the first and second times exceeds a threshold and performing, by the controller, an operating action when the difference between the first and second times exceeds the threshold.

Other aspects of the application will become apparent by consideration of the detailed description and accompanying drawings.

DETAILED DESCRIPTION

Figure 1:
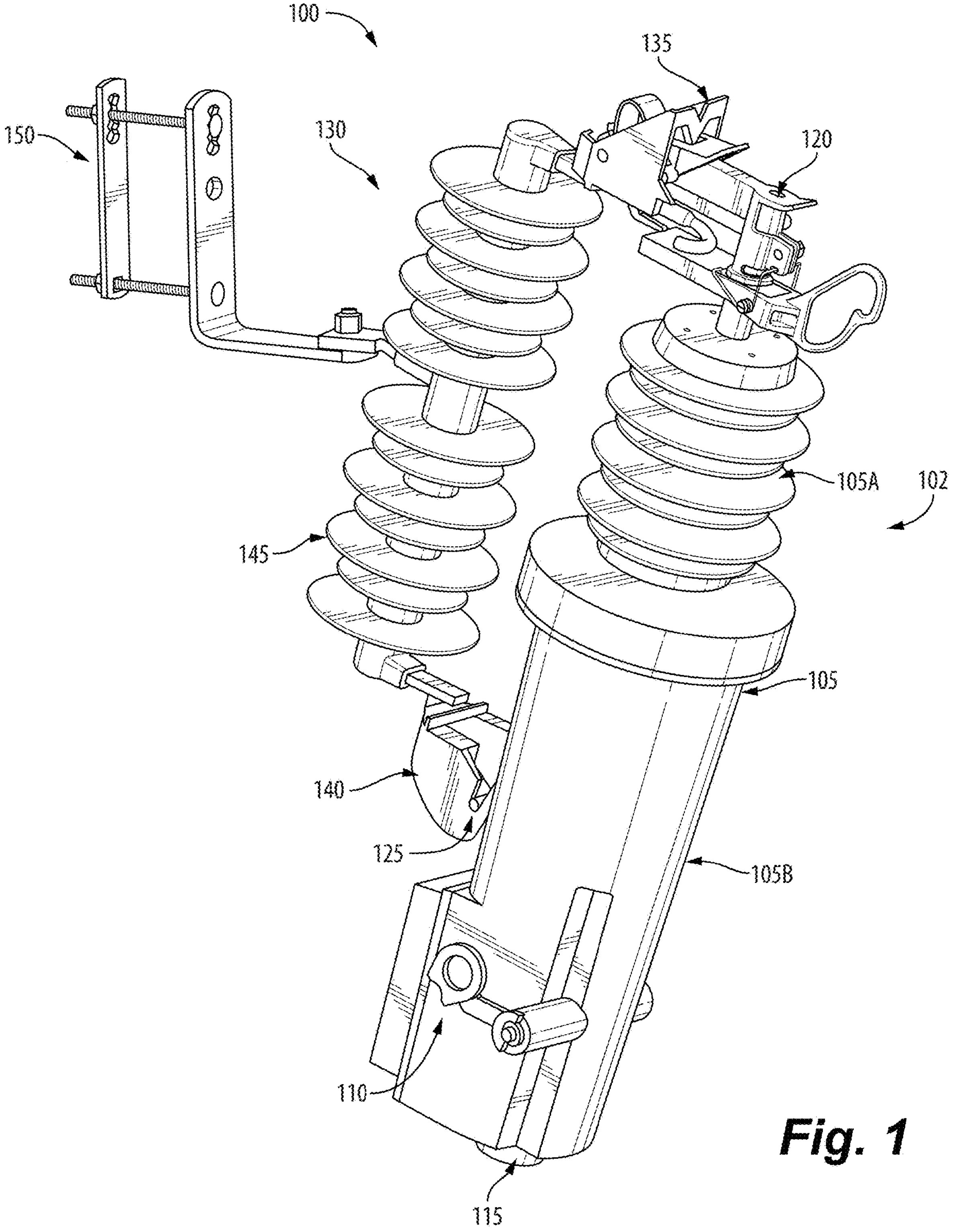
FIG. 1 illustrates a perspective view of a circuit interrupting device, such as a recloser, according to some aspects.

Before any embodiments of the application are explained in detail, it is to be understood that the application is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a circuit interrupting device, or recloser, assembly 100 for a power distribution system according to some embodiments. The recloser assembly 100 includes a circuit interrupting device, such as an automatic recloser 102. Although the circuit interrupting device is described herein as being implemented as a recloser 102, it should be understood that certain aspects of the recloser 102 may also be incorporated in other types of circuit interrupting devices that do not reclose, such as but not limited to non-reclosing circuit breakers. The recloser 102 includes a housing 105 that contains and/or supports one or more components for electrically connecting and disconnecting the recloser 102 to and from a power distribution system. In the illustrated example, the housing 105 includes an upper housing portion 105A that contains, for example, a circuit interrupter and a lower housing portion 105B that contains, or otherwise supports, control electronics, an actuator, and/or various other electrical and mechanical components included in the recloser 102. As will be described in more detail below, the housing 105 further supports a handle 110 for mechanically opening and/or closing the recloser 102 and an external indicator 115 for indicating a condition of the recloser 102.

The recloser 102 further includes first and second terminals 120, 125 that electrically connect the recloser 102 to the power distribution system. In the illustrated example, the first, or upper, terminal 120 extends outward from a top surface of the upper housing portion 105A and the second, or lower, terminal 125 extends outward from a side surface of the lower housing portion 105B. As will be described in more detail below, the upper and lower terminals 120, 125 are further configured to mechanically couple, or latch, the recloser 102 to a cutout 130.

As shown in FIG. 1, the cutout 130 includes a first, or upper, coupling mechanism 135 and a second, or lower, coupling mechanism 140. The upper and lower coupling mechanisms 135, 140 are disposed on opposing ends of an insulator 145 included in the cutout 130, thereby giving the cutout 130 a "C" shape. In particular, the upper coupling mechanism 135 is configured to electrically connect and/or mechanically couple to the upper terminal 120 of the recloser 102. Similarly, the lower coupling mechanism 140 is configured to electrically connect and/or mechanically couple to the lower terminal 125 of the recloser 102. The cutout 130 is supported by and mechanically coupled to a bracket 150, which may be mounted to a structure, such as a utility pole or tower, included in the power distribution system. In some instances, the recloser 102 is connected to the power distribution system using types of mounting hardware other than the illustrated cutout 130.

Figure 2:
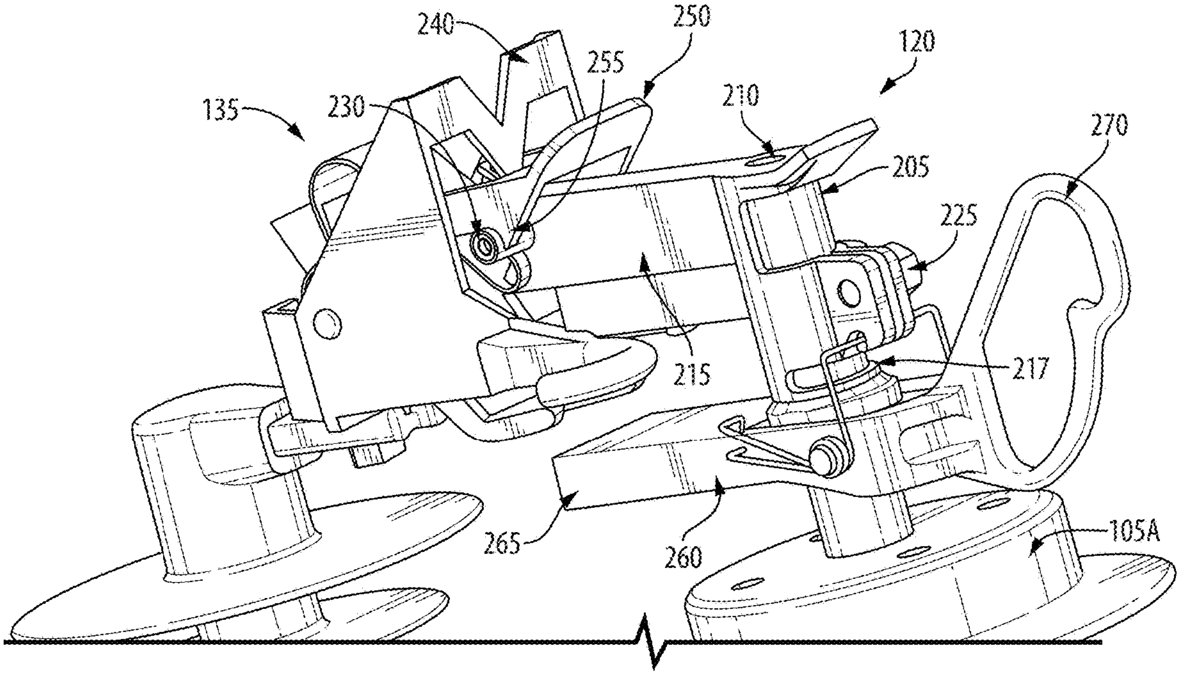
FIG. 2 illustrates a perspective view in which the recloser of FIG. 1 is in a latched configuration, according to some aspects.

With reference to FIGS. 2-7, in some embodiments the upper terminal 120 of the recloser 102 is configured to be selectively latched to and unlatched from the upper coupling mechanism 135 of the cutout 130. FIG. 2 illustrates a perspective view in which the upper terminal 120 is latched to the upper coupling mechanism 135 according to some embodiments. As shown in FIG. 2, the upper terminal 120 includes a contact rod 205 that extends vertically from the upper housing portion 105A. The contact rod 205 is constructed from a conductive material, such as steel, copper, bronze, aluminum, and/or any other suitable conductive material. As will be described in more detail below, the contact rod 205 is electrically connected to the internal components of recloser 102, such as the circuit interrupter. In the illustrated example, the contact rod 205 is cylindrical in shape. However, it should be understood that the in the some instances, the contact rod 205 may have a different shape.

The upper terminal 120 may further include a contact head 210 that is mechanically coupled and electrically connected to the contact rod 205. In some instances, the contact head 210 is constructed from bronze. In other instance, the contact head 210 is constructed from one or more other conductive material types, such as steel, copper, aluminum, and/or any other suitable conductive material. In the illustrated example, the contact head 210 is generally "L" shaped. The contact head 210 may include an arm portion 215 that extends laterally outward and an opening 217 that is configured to receive the contact rod 205. As shown, when the contact rod 205 is received by and extends through the contact head 210, the contact head 210 is seated on the contact rod 205 such that the arm portion 215 extends in a direction towards the upper coupling mechanism 135. In the illustrated example, the contact head 210 is secured to the contact rod 205 by one or more mechanical fasteners 225. In some instances, the contact rod 205 and the contact head 210 are integrated as a single component of the upper terminal 120. In other instances, the contact head 210 is secured to the contact rod 205 in other ways.

Figure 3:
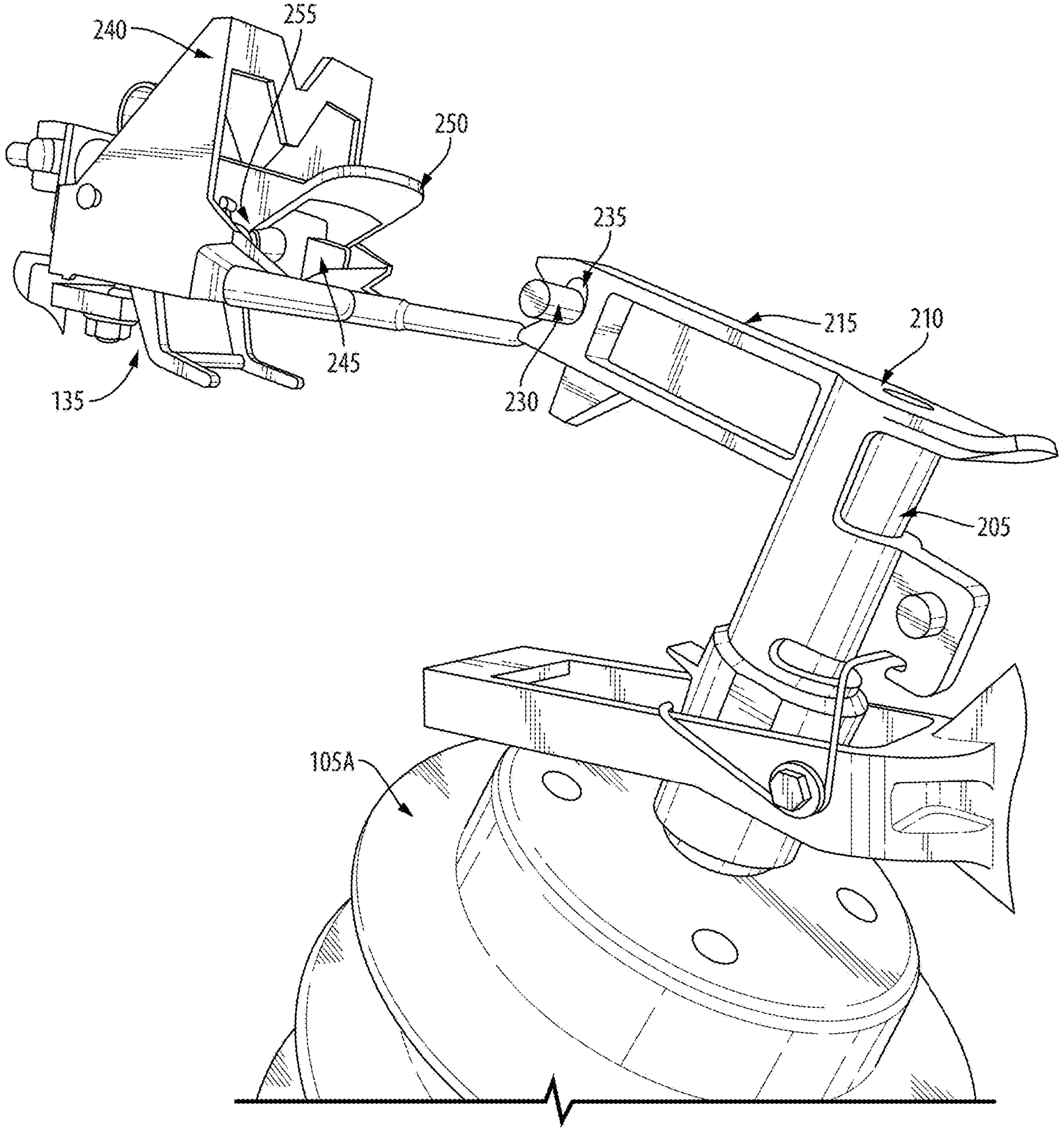
FIG. 3 illustrates a perspective view in which the recloser of FIG. 1 is in an unlatched configuration, according to some aspects

FIG. 3 illustrates a perspective view in which the upper terminal 120 is not latched to the upper coupling mechanism 135 according to some embodiments. As shown in FIG. 3, the contact head 210 of the upper terminal 120 further includes a pin 230. In some instances, the pin 230 is constructed from a conductive material, such as one or more of the conductive materials already described herein. In other instances, the pin 230 is constructed from an insulating material. In the illustrated example, the pin 230 has a generally cylindrical shape. However, it should be understood that in some instances, the pin 230 is formed to have a different shape (e.g., a hook shape, T-shape, etc.).

The pin 230 is positioned at an end of the arm portion 215 such that the pin 230 extends lengthwise in a direction that is perpendicular to the direction in which the arm portion 215 extends. In the illustrated example, the pin 230 extends through an opening 235 formed in an end of the arm portion 215, such that opposing ends of the pin 230 are disposed on, and extend outward from, opposite sides of the arm portion 215. In some instances, the arm portion 215 does not include an opening, and thus, the pin 230 is secured to the arm portion 215 in a different manner. In some instances, the pin 230 and the arm portion 215 are integrated as a single component.

As further shown in the embodiments of FIGS. 2 and 3, the upper coupling mechanism 135 includes a conductive frame 240 that defines an opening 245. The opening 245 is shaped and configured to receive the arm portion 215 of contact head 210. That is, when the recloser 102 is connected to the cutout 130, the arm portion 215 of the contact head 210 is inserted into the opening 245 formed in the upper coupling mechanism 135. The upper coupling mechanism 135 further includes a latching mechanism, or jaw, 250 that is rotatably coupled to frame 240 (for example, an interior of the frame 240). That is, the jaw 250 is configured to rotate about an axis within the opening 245 formed in the frame 240. In some instances, the jaw 250 is constructed from the same conductive material, such as any of the conductive materials described herein, that is used to construct the frame 240. In other instances, the frame 240 and the jaw 250 are constructed from different conductive materials or non-conductive materials.

As further shown, the jaw 250 includes a downward protruding member, or a tooth, 255 that is shaped and configured to latch onto the pin 230 when the contact head 210 is inserted in the opening 245. When the tooth 255 is latched onto the pin 230, the pin 230 abuts against a surface of the tooth 255 thereby preventing the contact head 210 from falling away from the upper coupling mechanism 135. Furthermore, while the contact head 210 is inserted in the opening 245 and the tooth 255 is latched onto the pin 230, the jaw 250 rests on the top surface of the contact head 210. Although the jaw 250 is free to pivot within the opening 245 when the contact head 210 is not inserted in the opening, the jaw 250 is prevented from pivoting downward by the top surface of the contact head 210 while the contact head 210 is inserted in the opening 245. Accordingly, the latching force applied by the tooth 255 to the pin 230, in combination with the pressing force applied by the jaw 250 to the top surface of the contact head 210, prevents the upper terminal 120 from disconnecting from the upper coupling mechanism 135 during operation of the recloser 102. For example, the latching force applied by the jaw 250 onto the pin 230 is strong enough to maintain the mechanical connection between the upper terminal 120 and the upper coupling mechanism 135 when the recloser 102 operates by separating the contacts included in the circuit interrupter.

Figure 4:
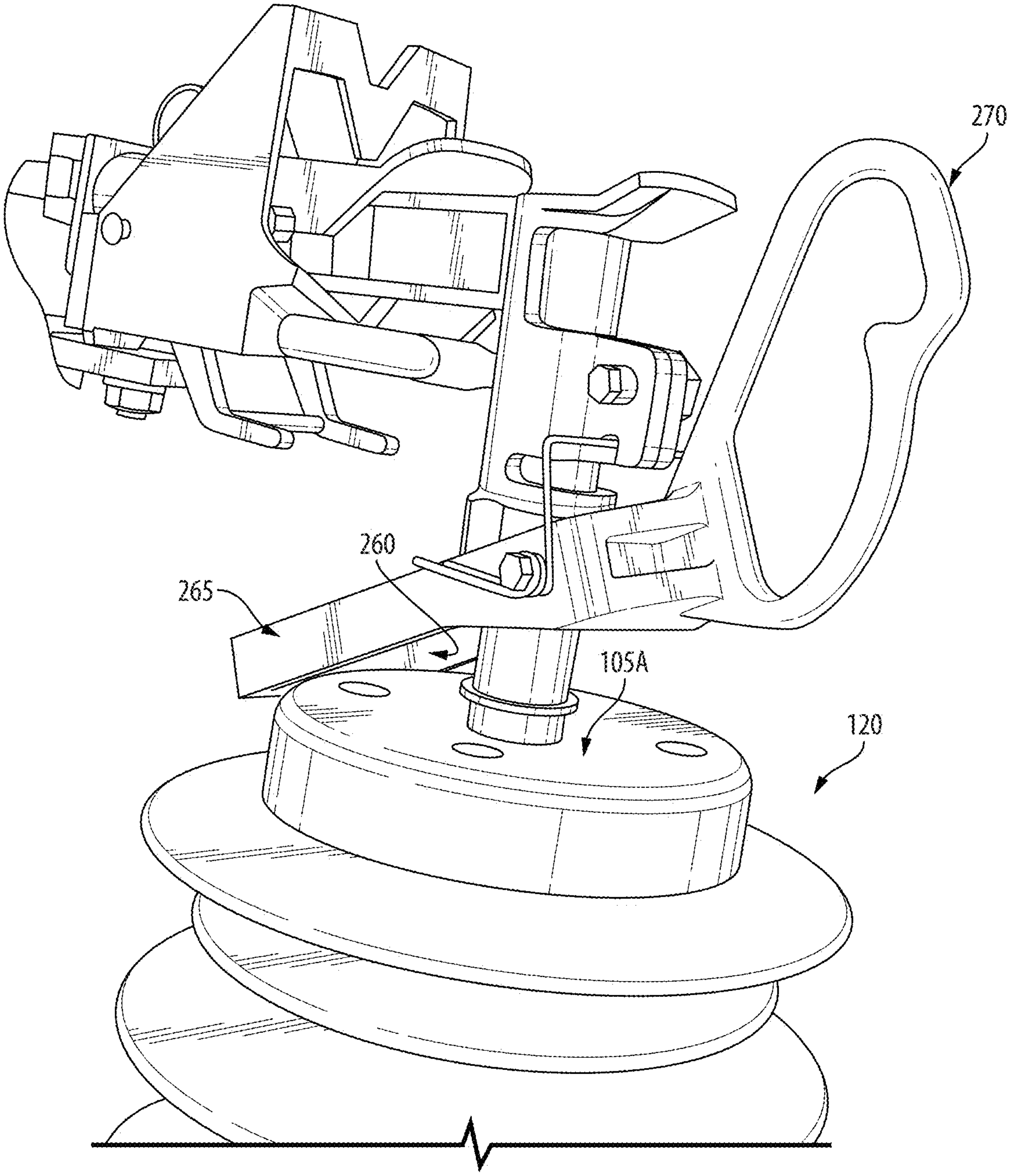
FIG. 4 illustrates a perspective view in which the recloser of FIG. 1 is in a latched configuration, according to some aspects

In some instances, such as during a repair, an operator (e.g., a lineman) may desire to disconnect the upper terminal 120 of the recloser 102 from the upper coupling mechanism 135. Thus, the upper terminal 120 and upper coupling mechanism 135 may further include components that are configured to selectively unlatch the upper terminal 120 from the upper coupling mechanism 135. As best shown in the embodiment of FIG. 4, the recloser 102 further includes a lever 260 that is rotatably coupled to the upper terminal 120. A first end 265 of the lever 260 extends in a direction towards the upper coupling mechanism 135 such that, when the lever 260 is in a resting position and the contact head 210 is latched to the upper coupling mechanism 135 (as shown in FIGS. 2 and 4), the first end 265 of the lever 260 is disposed underneath the frame 240 of the upper coupling mechanism 135. In the illustrated example, while in the resting position, the lever 260 is rotated relative to the upper terminal 120 such that first end 265 rests atop the upper housing portion 105A and a second end 270 of the lever 260 rests in a position above the upper housing portion 105A. However, in some instances, the first end 265 of the lever 260 does not rest atop the upper housing portion 105A.

Figure 5:
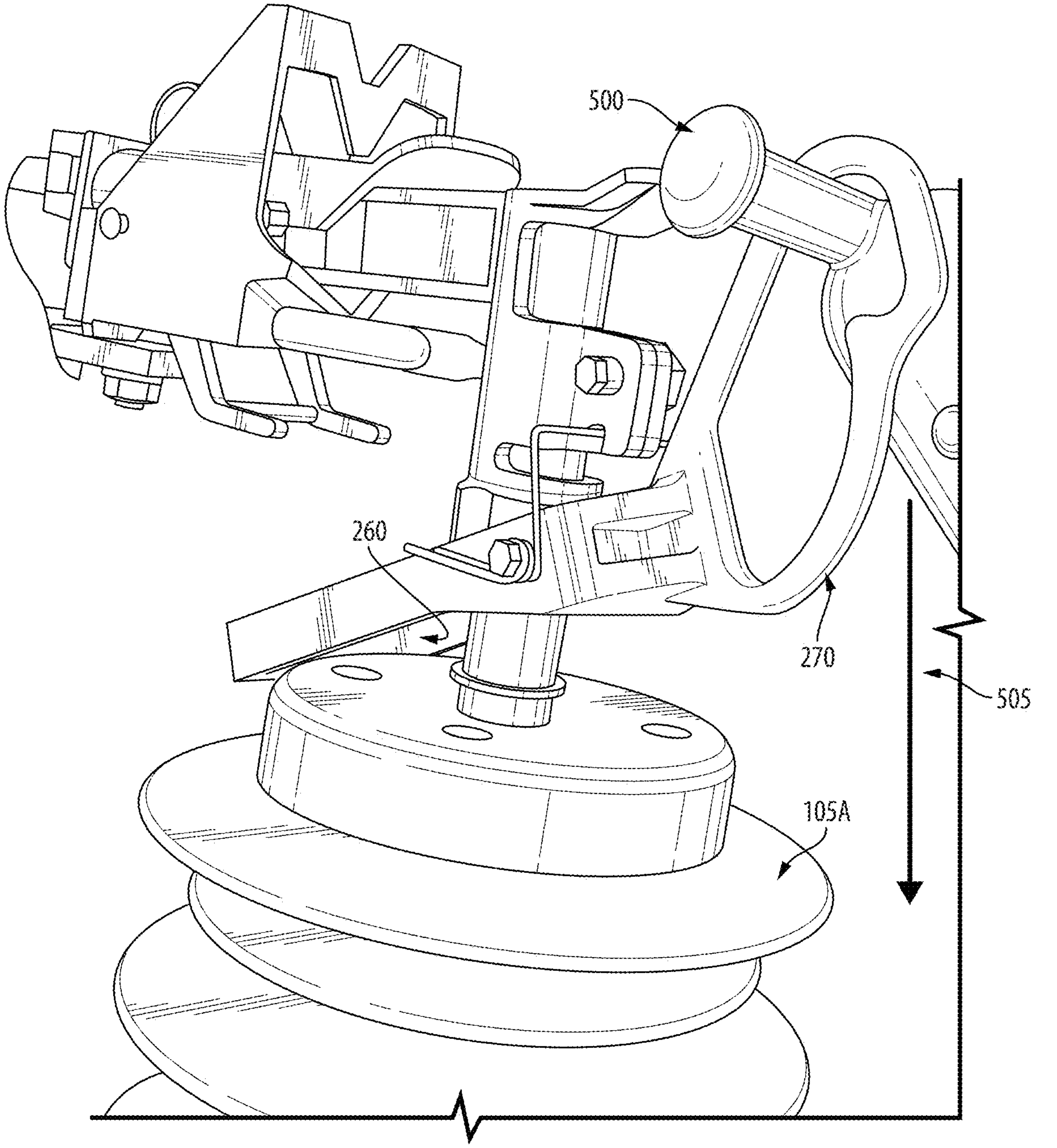
FIG. 5 illustrates a perspective view in which the recloser of FIG. 1 is engaged by a hot stick, according to some aspects

In the illustrated example, the second end 270 of the lever 260 is loop shaped. In particular, the second end 270 has the shape of a hot stick loop that is configured to receive and engage a hot stick, or equivalent tool, used by a user (e.g., lineman). Accordingly, the second end 270 may be hereinafter referred to as the hot stick loop 270. FIG. 5 illustrates an instance in which a hot stick 500 is inserted in and engaged with the hot stick loop 270. In some instances, the second end 270 has a different shape that is configured to engage a lineman tool.

Figure 6:
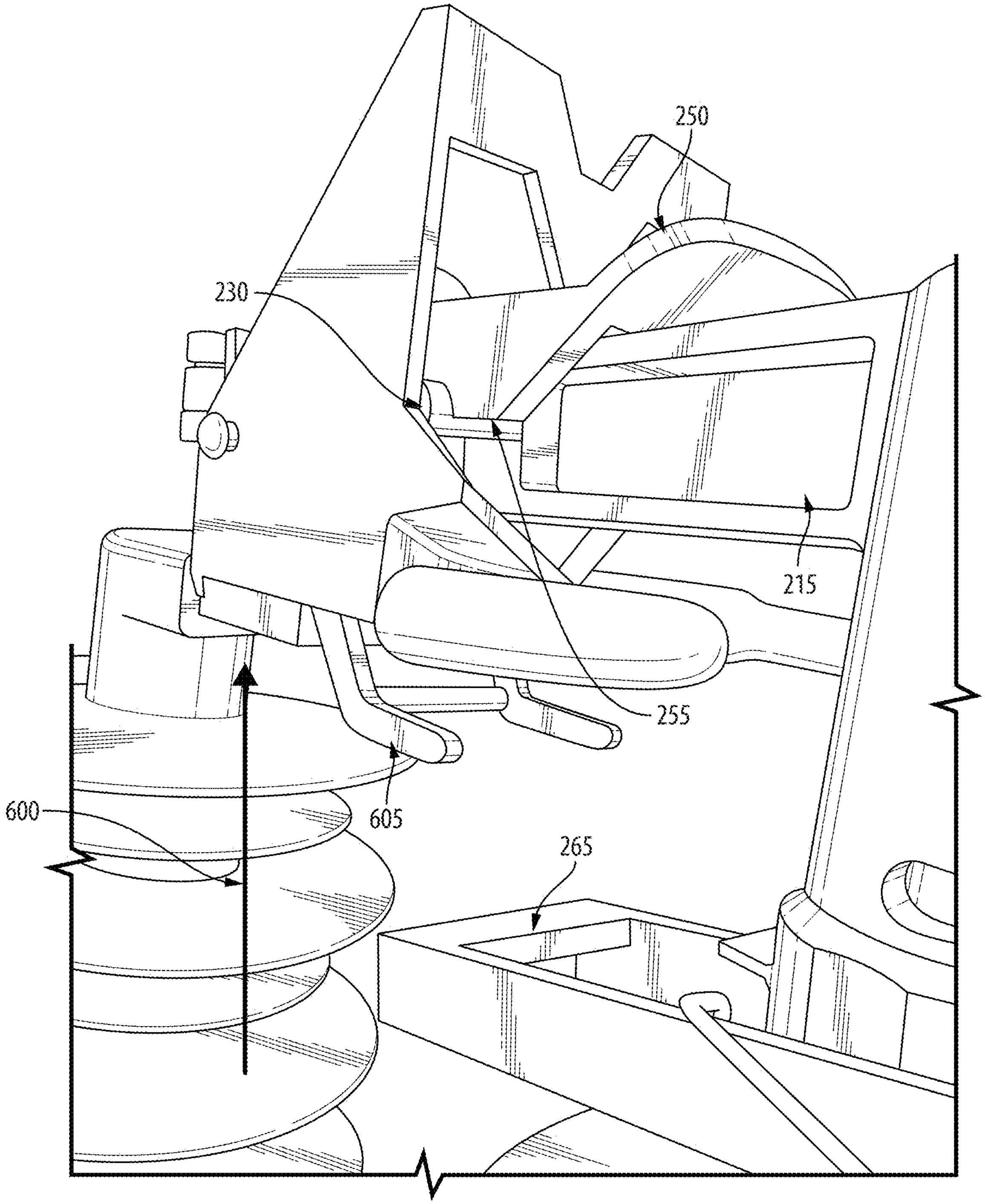
FIG. 6 illustrates a perspective view in which the recloser of FIG. 1 is in a latched configuration, according to some aspects
Figure 7:
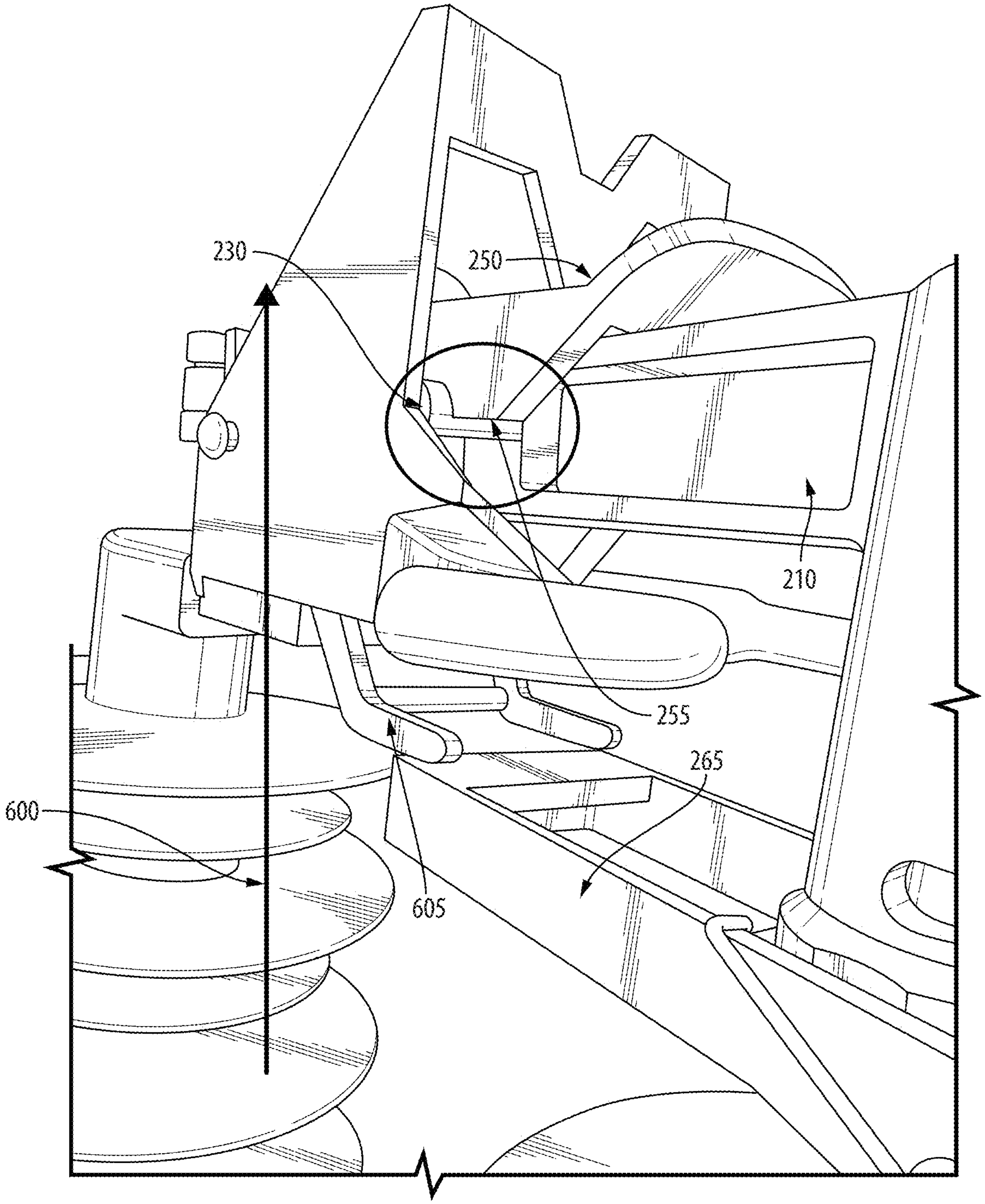
FIG. 7 illustrates a perspective view of the recloser of FIG. 1 prior to being unlatched, according to some aspects

With reference to FIGS. 5-7, a lineman may unlatch the upper terminal 120 from the upper coupling mechanism 135 by pulling, with a hot stick 500, or equivalent tool, the hot stick loop 270 in a downward direction 505 (FIG. 5). When the hot stick loop 270 is pulled in the downward direction 505, the lever 260 rotates relative to the upper terminal 120 such that first end 265 moves in an upward direction 600 (FIGS. 6 and 7). When the first end 265 moves in the upward direction 600, the first end 265 engages a bottom surface 605 of the jaw 250 included in the upper coupling mechanism 135. As described above, the jaw 250 is rotatably coupled within the frame 240 of the upper coupling mechanism 135. Thus, the jaw 250 rotates and moves in the upward direction 600 when the first end 265 presses against the bottom surface 605 of the jaw 250. That is, the first end 265 of the lever 260 forces the jaw 250 to move upward, thereby unlatching the pin 230 from the tooth 255. When the pin 230 is unlatched, the lineman is able to pull the upper terminal 120 away from the cutout 130.

Figure 8:
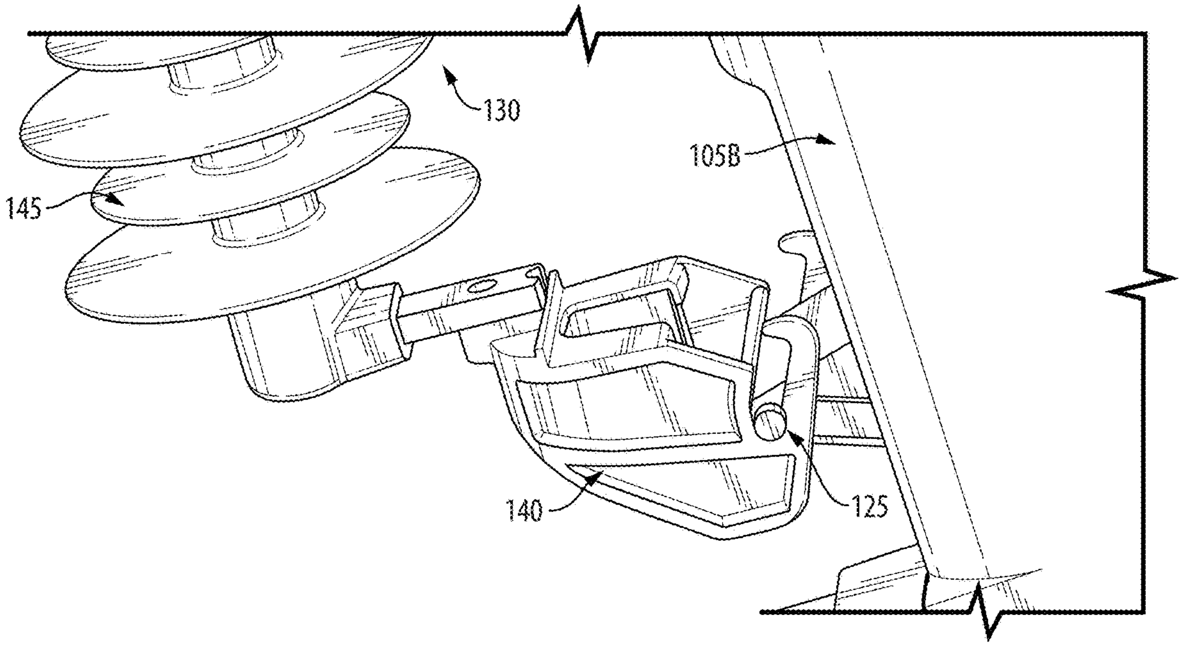
FIG. 8 illustrates a perspective view of a lower terminal of the recloser of FIG. 1, according to some aspects.

FIG. 8 illustrates a close-up view in which the lower terminal 125 is electrically and mechanically coupled to the lower coupling mechanism 140 of the cutout 130 according to some embodiments. As shown, the lower coupling mechanism 140 may include notches formed within that are configured to receive and hold the lower terminal 125 in place while the recloser 102 is connected to the power distribution system. As further shown, the lower terminal 125 may include rounded, or cylindrically shaped, edges that enable the recloser 102 to rotate about the lower terminal 125 while the lower terminal 125 is seated within the lower coupling mechanism 140. For example, the recloser 102 may be rotated downwards about the lower terminal 125 when a lineman unlatches the upper terminal 120 from the upper coupling mechanism 135 during a repair.

Electromagnetic Actuator and Circuit Interrupter

Figure 9:
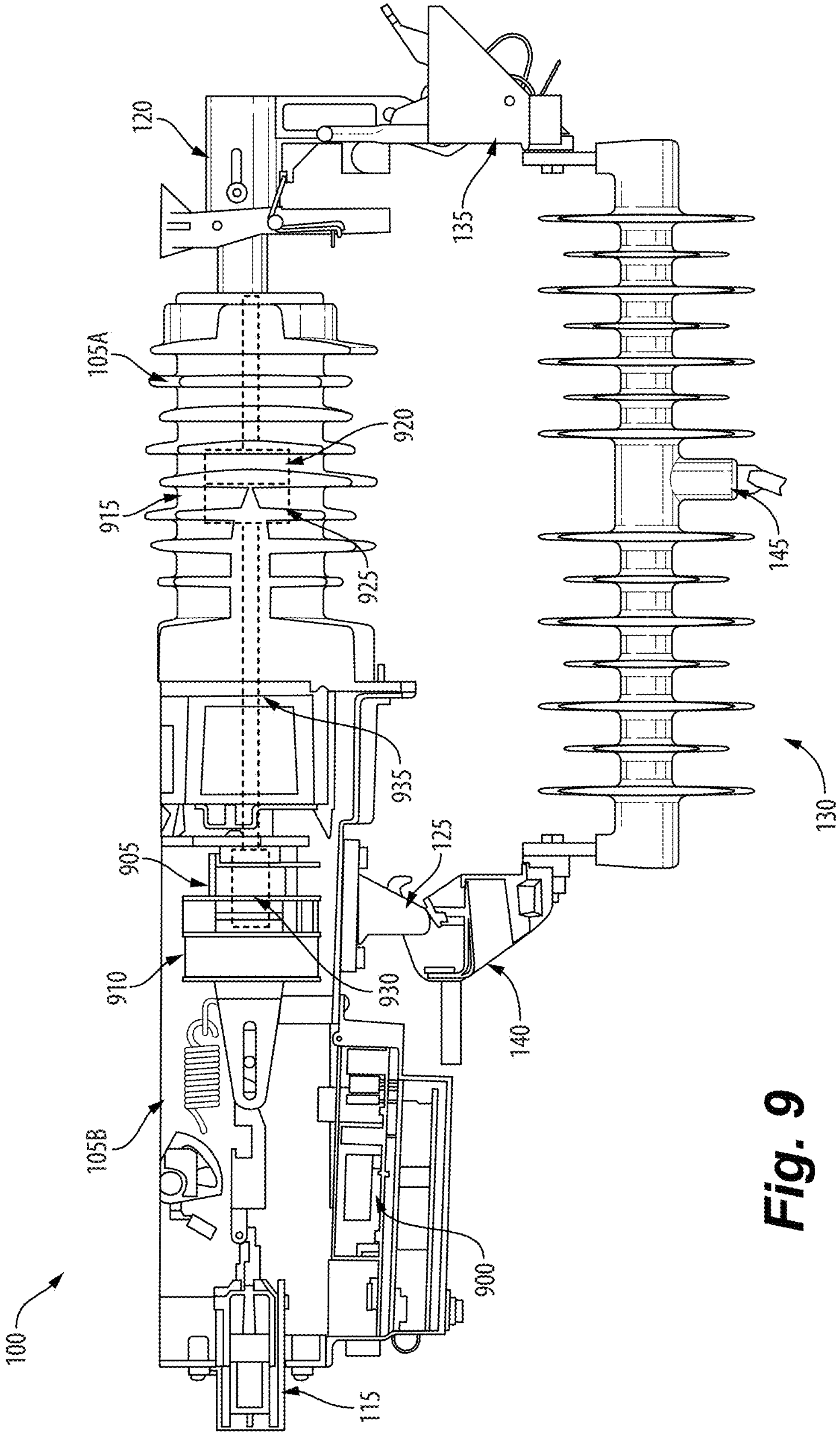
FIG. 9 illustrates a side view in which the recloser of FIG. 1 is in a closed configuration, according to some aspects.
Figure 10:
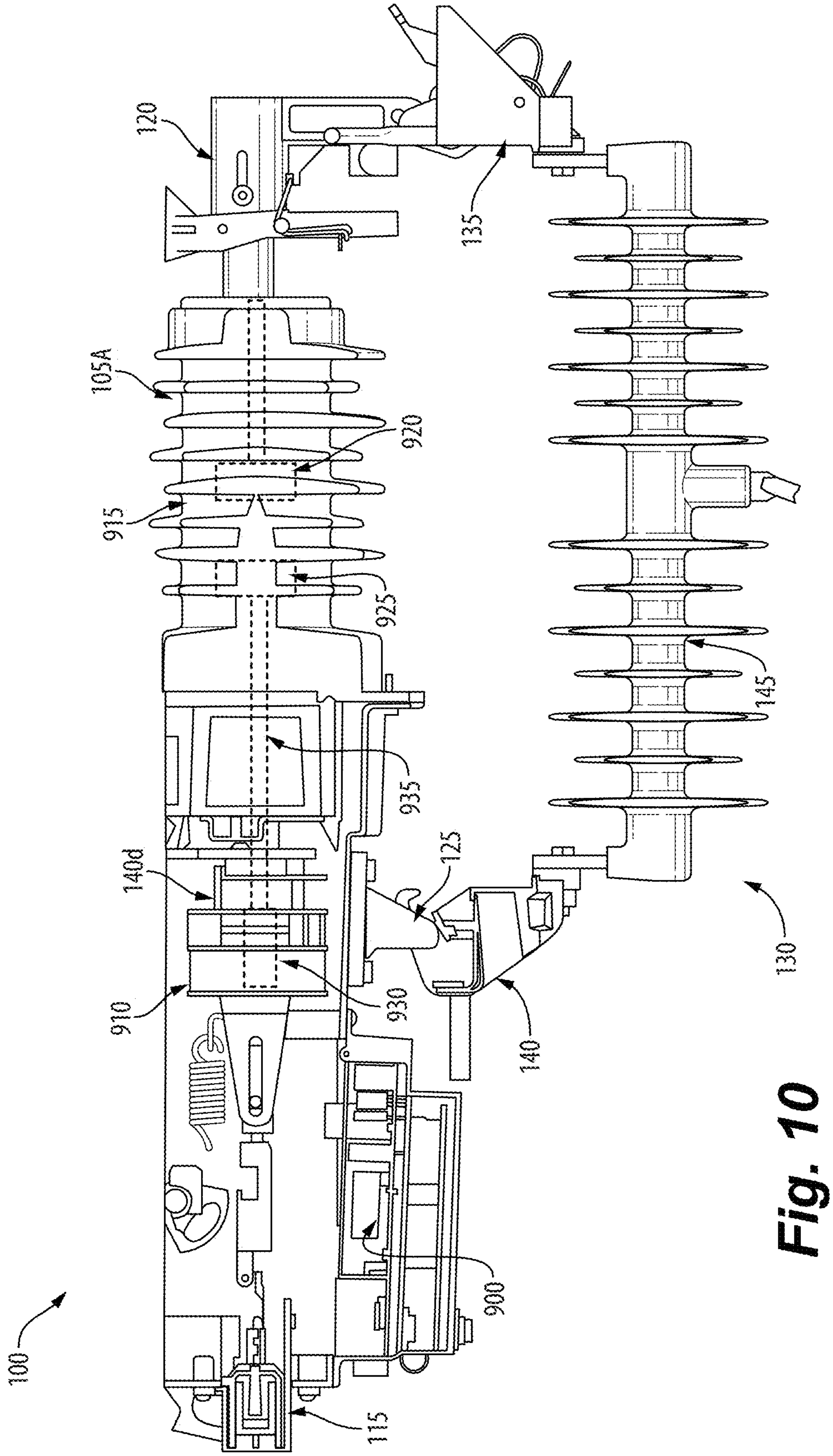
FIG. 10 illustrates a side view in which the recloser of FIG. 1 is in an open configuration, according to some aspects.

FIGS. 9 and 10 illustrate respective side views of the recloser 102 in which a section of the lower housing portion 105B has been removed to expose the components of the recloser 102 contained within, according to some embodiments. As shown, the lower housing portion 105B may contain a printed circuit board (PCB), or control board, 900 and a sensor PCB, or sensor board, 905. The control and sensor boards 900, 905 respectively support one or more control electronics included in the recloser 102. As will be described in more detail below, the lower housing portion 105B may further contain numerous mechanical components, or linkages, that are mechanically coupled to the handle 110 for mechanically opening and/or closing the recloser 102. Similarly, as will be described in more detail below, the lower housing portion 105B may further contain numerous mechanical components, or linkages, that are coupled to the external indicator 115 for indicating a condition of the recloser 102.

The lower housing portion 105B may further contain an electromagnetic actuator 910 that is configured to selectively open and close the circuit interrupter 915 contained within the upper housing portion 105A. Since no portion of the upper housing portion 105A has been removed in FIGS. 9 and 10, components of the circuit interrupter 915 are illustrated using dashed lines. The circuit interrupter 915 includes a stationary contact 920 that is electrically connected to the upper terminal 120 of the recloser 102. The circuit interrupter 915 also includes moveable contact 925 that is electrically connected to the lower terminal 125 of the recloser 102. As will be described in more detail below, the actuator 910 is mechanically coupled to the circuit interrupter 915 by a plunger 930 and a pushrod 935.

When the contacts 920, 925 of the circuit interrupter 915 are in contact with each other (e.g., pressed together) as shown in FIG. 9, current is permitted to flow from the upper terminal 120 to the lower terminal 125 through the circuit interrupter 915. With respect to FIG. 9, the recloser 102 is configured in what may be referred to hereinafter as a closed state, or closed configuration, when the contact 920, 925 are in physical and electrical contact with each other. In contrast, when the contacts 920, 925 of the circuit interrupter 915 are separated from each other as shown in FIG. 10, the circuit is interrupted and current does not flow from the upper terminal 120 to the lower terminal 125. With respect to FIG. 10, the recloser 102 is configured in what may be referred to hereinafter as an open state, or open configuration, when the 920, 925 are physically and electrically separated from each other. In some instances, the circuit interrupter 915 is implemented as a vacuum interrupter. In some instances, the circuit interrupter is implemented as a different type of circuit interrupter.

Figure 11:
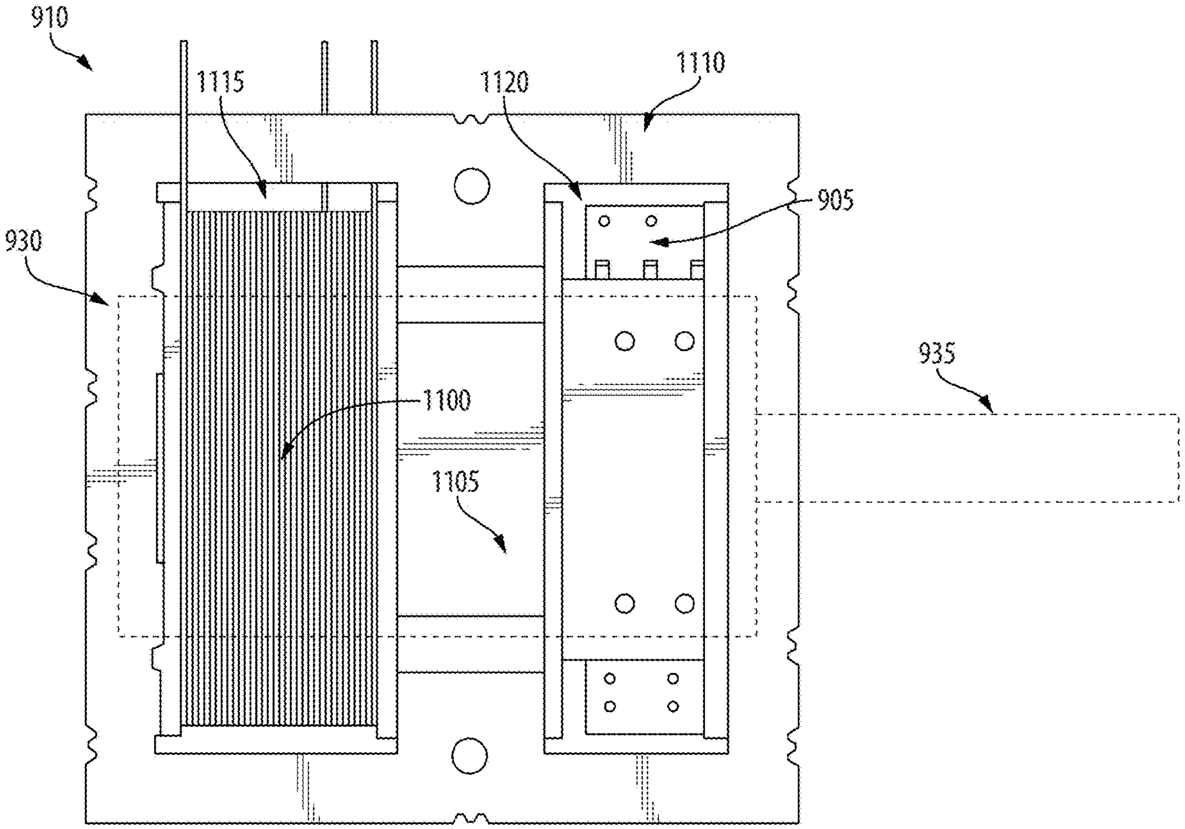
FIG. 11 illustrates a side view of an electromagnetic actuator included in the recloser of FIG. 1, according to some aspects.

FIG. 11 illustrates a close-up view of the electromagnetic actuator 910 according to some embodiments. The actuator 910 may include a single coil 1100 that is wound around a bobbin assembly 1105 installed on a magnetic frame 1110 of the actuator 910. In operation, the coil 1100 is energized to open and close the actuator 910, and correspondingly, open and close the circuit interrupter 915. In particular, the coil 1100 is energized with current provided by the power distribution system to which the recloser 102 is connected since the recloser 102 does not include an internal power source (e.g., a battery). When compared to electromagnetic actuators that include two coils and/or that are powered by an internal power source (e.g., a battery), the single coil actuator 910 of the illustrated recloser 102 comparatively takes up less space within the housing 105, thereby reducing the overall size and/or cost of the recloser 102.

The magnetic frame 1110 may include a first space 1115 that is defined within the magnetic frame 1110 to accommodate the coil 1100 and a second space 1120 that is defined within the magnetic frame 1110 to accommodate the sensor board 905. In the illustrated example, the first space 1115 is formed to be larger than the second space 1120 thereby providing more space within the magnetic frame 1110 to wind the coil 1100. In particular, the extra space allows for the coil 1100 to be wound using a larger gauge wire that is rated to handle high currents, and correspondingly, generate strong magnetic fields. Accordingly, by providing more space within the actuator 910 for winding the single coil 1100 with larger gauge wire, it is possible to generate a magnetic field that is equal to or greater in strength than a magnetic field that would otherwise only be generated by an actuator that includes two or more coils.

As described above, the actuator 910 may further include a plunger 930 that is mechanically coupled to the circuit interrupter 915 by the pushrod 935. Upon energization of the coil 1100 shown, a magnetic field is generated that forces the plunger 930 to move in a direction towards, or in a direction away, from the circuit interrupter 915. For example, when the coil 1100 is excited with current that flows in a first direction (e.g., clockwise) through the coil 1100, the plunger 930 moves in a direction away from the circuit interrupter 915. Accordingly, in such an example, the pushrod 935 coupled to the plunger 930 pulls the moveable contact 925 away from the stationary contact 920, thereby causing the recloser 102 to be in an open state. As another example, when the coil 1100 is excited with current that flows in a second direction (e.g., counterclockwise) through the coil 1100, the plunger 930 moves in a direction away from the circuit interrupter 915. Accordingly, in such an example, the pushrod 935 coupled to the plunger 930 pushes the moveable contact 925 towards the stationary contact 920, thereby closing the circuit interrupter 915 and placing the recloser 102 in a closed state. In some instances, the pushrod 935 is threaded to the moveable contact 925. In some instances, the pushrod 935 is mechanically coupled to the moveable contact 925 in other ways.

Figure 12:
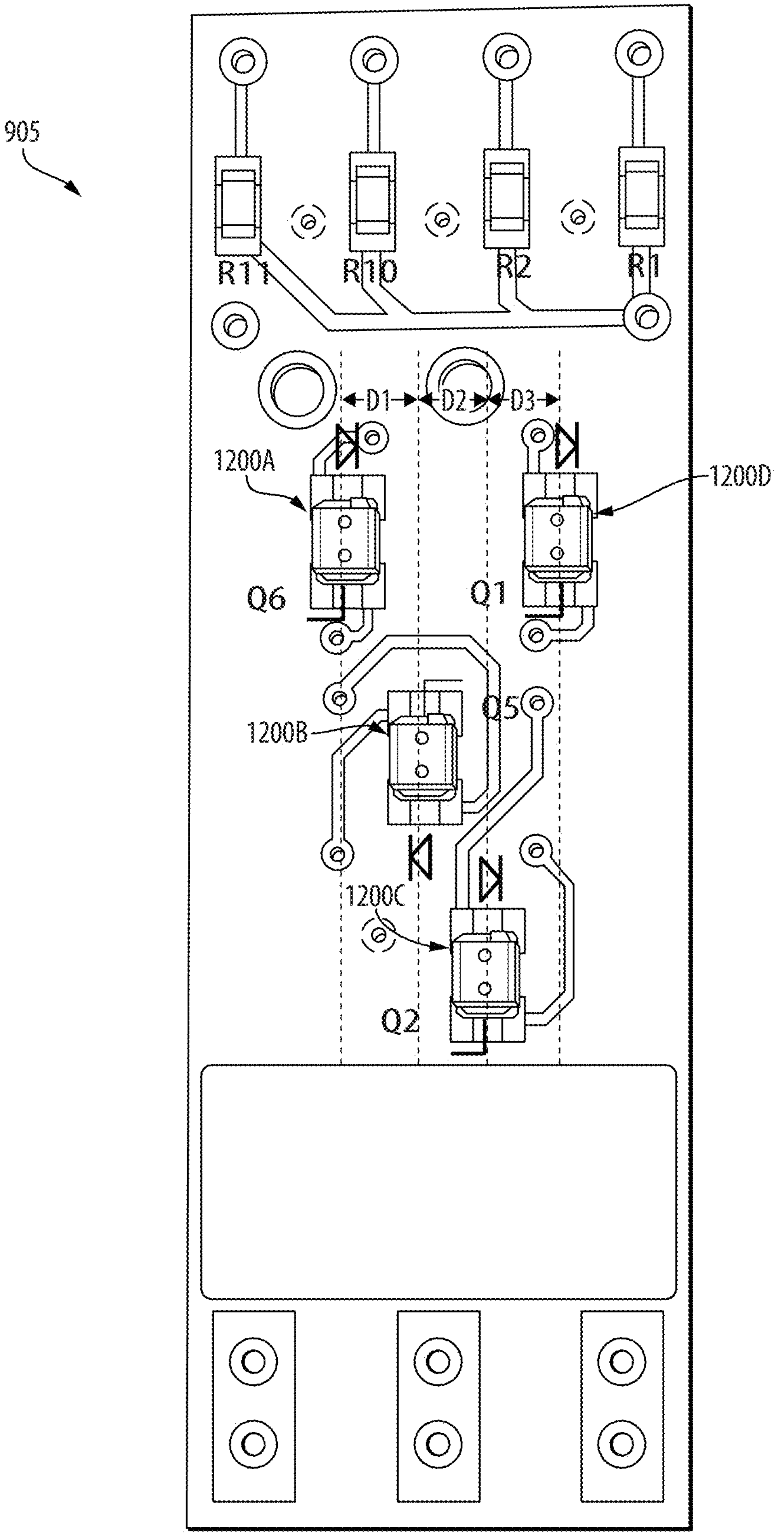
FIG. 12 illustrates a perspective view of a sensor board included in the recloser of FIG. 1, according to some aspects.

As described above, the actuator 910 may further support the sensor board 905. In the illustrated example, the sensor board 905 is mounted to the bobbin assembly 1105. In other examples, the sensor board 905 is supported within the housing 105 in other ways. FIG. 12 illustrates a perspective view of the sensor board 905. In the illustrated embodiment, the sensor board 905 includes a plurality of position sensors 1200A-1200D (for example, optical position sensors) that are configured to detect a position of the plunger 930, and thus, are used to determine whether the circuit interrupter 915 is open or closed based on the detected position of plunger 930. It should be understood that although the sensor board 905 is illustrated as including four position sensors 1200A-1200D, in some instances, the sensor board 905 includes more or less than four position sensors. In some instances, other types of position sensors are used.

The position sensors 1200A-1200D are mounted at predetermined positions relative to each other on the sensor board 905. For example, the first and second position sensors 1200A, 1200B are mounted to the sensor board 905 such that lateral distance between the first and second position sensors 1200A, 1200B is a first predetermined distance D1. Similarly, the second and third position sensors 1200B, 1200C are mounted to the sensor board 905 such that the lateral distance between the second and third position sensors 1200B, 1200C is a second predetermined distance D2. Moreover, the third and fourth position sensors 1200C, 1200D are mounted to the sensor board 905 such that the lateral distance between the third and fourth position sensors 1200C, 1200D is a third predetermined distance D3. The respective lateral distances D1-D3 between position sensors 1200A-1200D are parallel to the direction in which the plunger 930 moves to open and close the circuit interrupter 915. Accordingly, the respective lateral distances D1-D3 between the position sensors 1200A-1200D are representative of the lateral distance travelled by the plunger 930 as the plunger 930 moves between the position sensors 1200A-1200D.

In some embodiments, each of the position sensors 1200A-1200D include a respective transmitter and a respective receiver. In some instances, the transmitter is a light emitting diode (LED) that outputs a light signal. In other instances, the transmitter is implemented as a different type of signal transmitter. In operation, the transmitter included in a particular position sensor 1200 outputs, or transmits, a light signal. If the light signal that is output by the transmitter is obscured, such as blocked by the plunger 930, the light signal is reflected back to the receiver included in the position sensor 1200. When the receiver receives a reflected light signal, the position sensor 1200 generates a signal having a high voltage value (e.g., 3.5 volts). In contrast, if the light signal that is output by the transmitter is not obscured (e.g., by the plunger 930), the light signal is not reflected back to the receiver. When the receiver does not receive a reflected light signal, the position sensor 1200 generates a signal having a low voltage value (e.g., 0 volts). As will be described in more detail below, it is possible to determine a position of the plunger 930 within the actuator 910, a speed of the plunger 930 as it moves through the actuator 910, and whether the circuit interrupter 915 has been damaged based on the signals generated by the position sensors 1200A-1200D.

Figure 13:
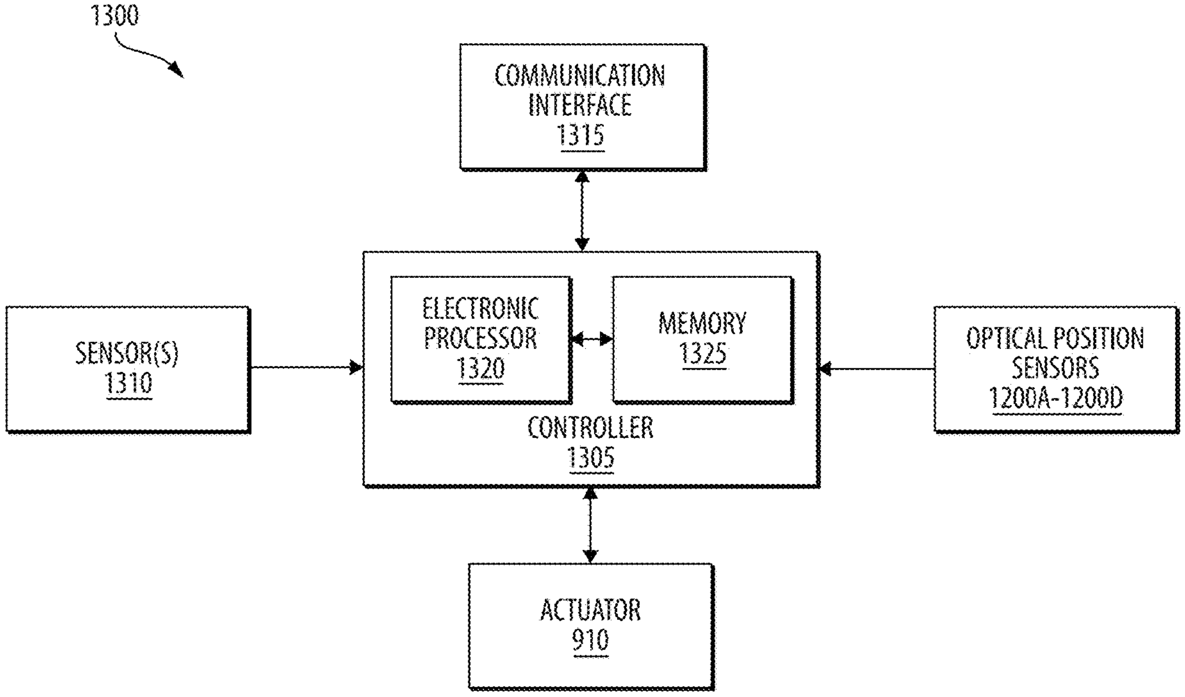
FIG. 13 illustrates a block diagram of a control system of the recloser of FIG. 1, according to some aspects.

FIG. 13 illustrates a block diagram of the control system 1300 for the recloser 102 according to some embodiments. The control system 1300 includes a controller 1305 that is electrically and/or communicatively connected to a variety of modules or components of the recloser 102. For example, the controller 1305 is connected to the actuator 910, the position sensors 1200A-1200D, one or more additional sensors 1310, and/or a communication interface 1315. In some instances, the controller 1305 is mounted to, or otherwise supported by, the control board 900. In other instances, the controller 1305 is located elsewhere within the housing 105 of the recloser 102.

As described above, the controller 1305 is connected to one or more additional sensors 1310 that are configured to sense one or more electrical characteristics of the recloser 102 and/or the power distribution system to which the recloser 102 is connected. For example, the sensor(s) 1310 include one or more current, voltage, and/or temperature sensors that are configured to sense a line current and/or voltage flowing through the power distribution system. In operation, the controller 1305 controls the actuator 910 to open and/or close the circuit interrupter 915 based on measurements taken by the one or more sensors 1310. For example, the controller 1305 is configured to control the actuator 910 to open the circuit interrupter 915 in response to receiving signals from the sensor(s) 1310 that indicate the occurrence of an electrical fault (e.g., overvoltage, overcurrent, loss of voltage, etc.) within the power distribution system.

The communication interface 1315 is configured to provide communication between recloser 102 and an external device (for example, a server, an external computer, a smart phone, a tablet, a laptop, etc.). In some instances, the communication interface 1315 allows the recloser 102 to communicate with external devices operated by a utility service provider and/or a utility service customer. In such instances, the recloser 102 communicates with the one or more external devices through a network. The network is, for example, a wide area network (WAN) (e.g., the Internet, a TCP/IP based network, a cellular network, such as, for example, a Global System for Mobile Communications [GSM] network, a General Packet Radio Services [GPRS] network, a Code Division Multiple Access [CDMA] network, an Evolution-Data Optimized [EV-DO] network, an Enhanced Data Rates for GSM Evolution [EDGE] network, a 3 GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN).

In some instances, the controller 1305 includes a plurality of electrical and electronic components that provide power, operational control, and protection to the components and modules within the controller 1305 and/or the recloser 102. For example, the controller 1305 includes, among other things, an electronic processor 1320 (for example, a microprocessor or another suitable programmable device) and a memory 1325.

The memory 1325 includes, for example, a program storage area and a data storage area. The program storage area and the data storage area can include combinations of different types of memory, such as read-only memory (ROM) and random-access memory (RAM). Various non-transitory computer readable media, for example, magnetic, optical, physical, or electronic memory may be used. The electronic processor 1320 is communicatively coupled to the memory 1325 and executes software instructions that are stored in the memory 1325, or stored in another non-transitory computer readable medium such as another memory or a disc. The software may include one or more applications, program data, filters, rules, one or more program modules, and other executable instructions.

Figure 14:
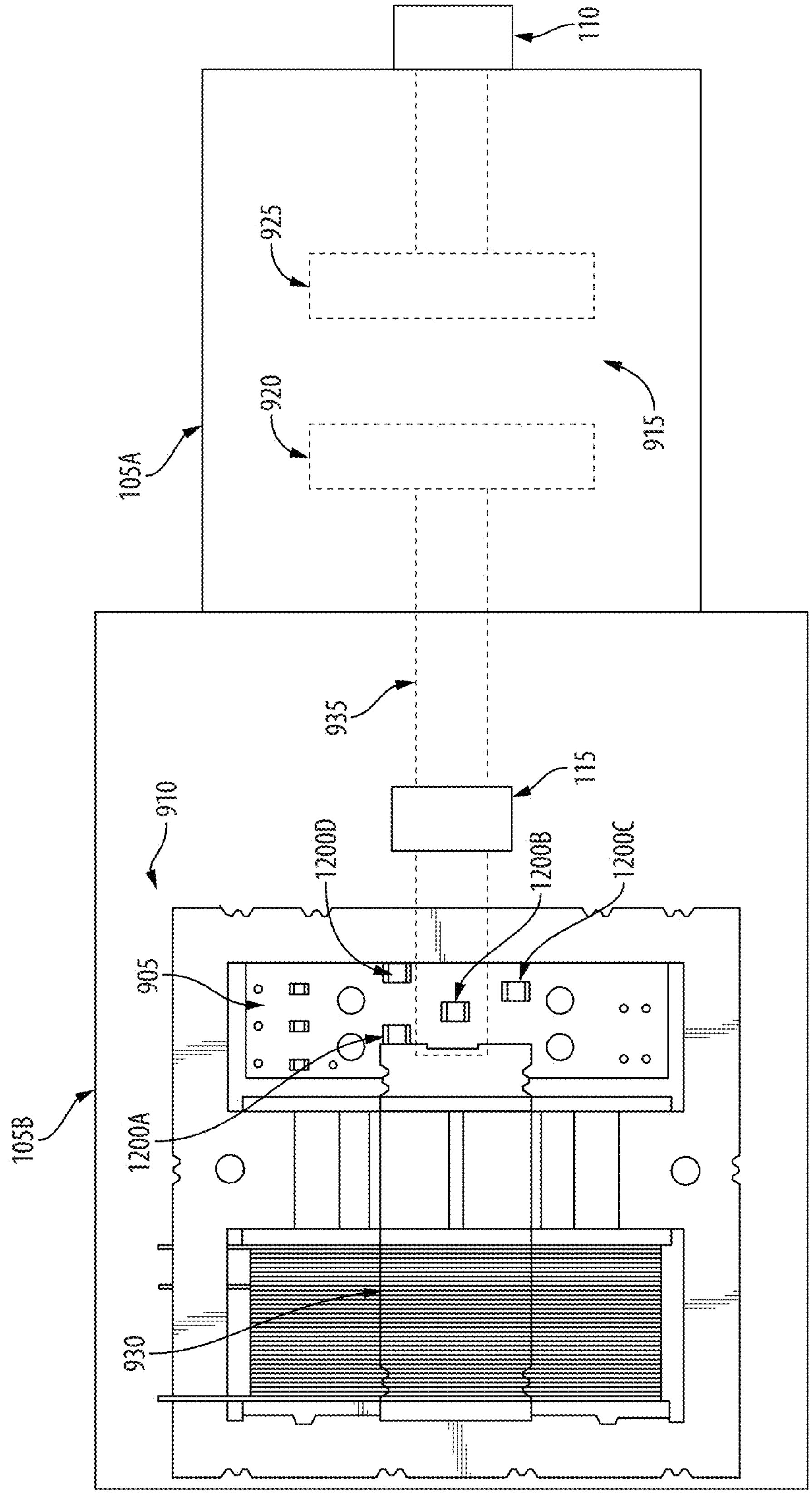
FIG. 14 illustrates a schematic drawing in which the recloser of FIG. 1 is in an open configuration, according to some aspects.
Figure 15:
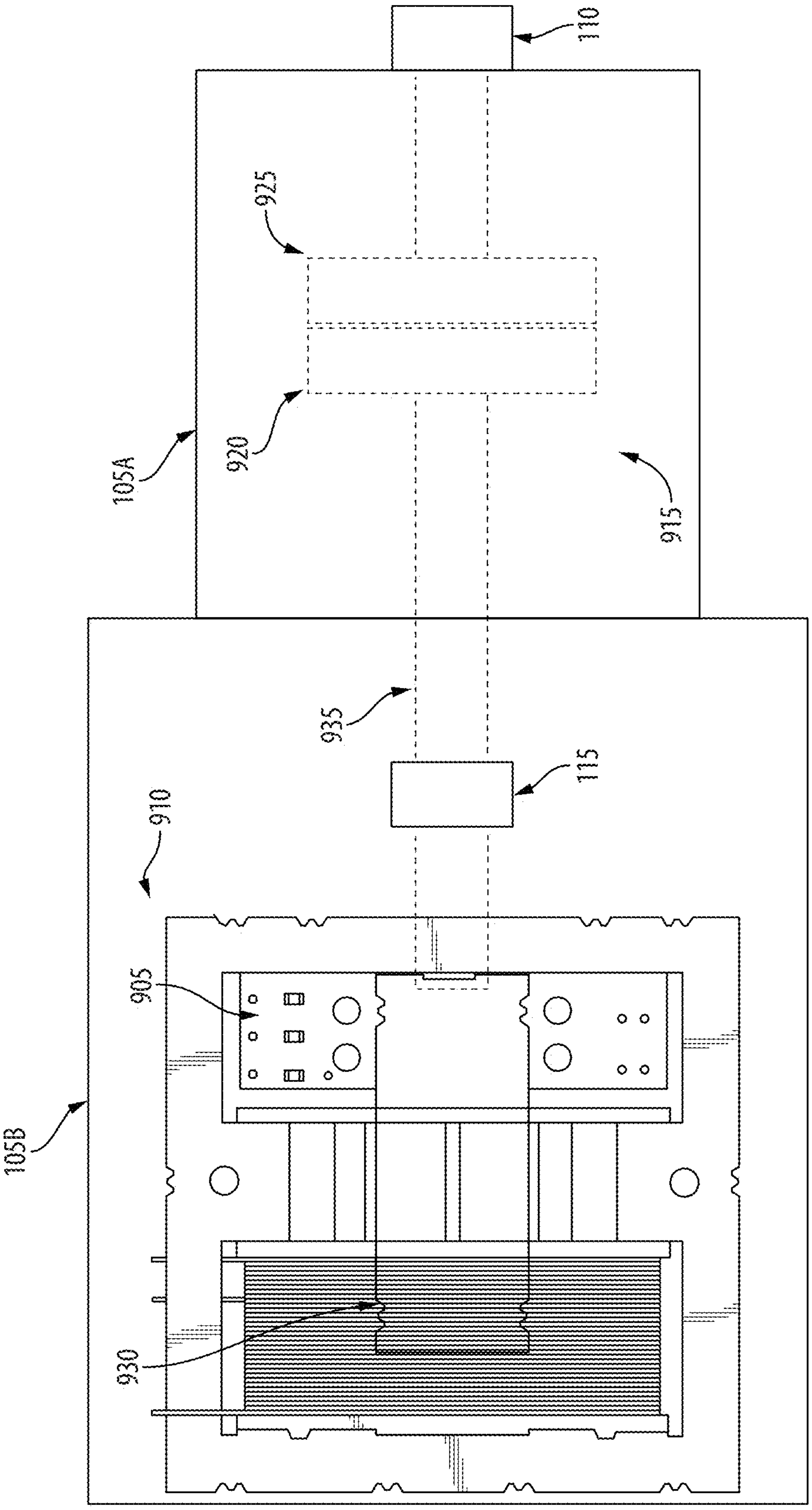
FIG. 15 illustrates a schematic drawing in which the recloser of FIG. 1 is in a closed configuration, according to some aspects.

As described above, the controller 1305 is further connected to a plurality of position sensors 1200A-1200D (for example, but not limited to, optical position sensors) that are used for detecting a position and/or speed of the plunger 930 within the actuator 910. Furthermore, the position sensors 1200A-1200D are used to detect whether the contacts 920, 925 included in the circuit interrupter 915 have been damaged (e.g., eroded). FIG. 14 illustrates a schematic diagram in which the circuit interrupter contacts 920, 925 are separated and the recloser 102 is in the open state, according to some embodiments. When the recloser 102 is in the open state, the position sensors 1200A-1200D are not obscured by the plunger 930. That is, light signals transmitted by the respective transmitters included in the position sensors 1200A-1200D do not get reflected by the plunger 930 when the recloser is in the open state. In contrast, FIG. 15 illustrates a schematic diagram in which the circuit interrupter contacts 920, 925 are contact with each other and the recloser 102 is in the closed state, according to some embodiments. When the recloser 102 is in the closed state, the position sensors 1200A-1200D are obscured by the plunger 930. Accordingly, light signals transmitted by the respective transmitters included in the position sensors 1200A-1200D are reflected off the plunger 930 towards the respective receivers included in the position sensors 1200A-1200D when the recloser is in the closed state.

The controller 1305 is configured to determine an amount of time that it takes for the circuit interrupter 915 to move from the open state (FIG. 14) to the closed state (FIG. 15) based on signals generated by the position sensors 1200A-1200D. When the circuit interrupter 915 is in the fully open state (FIG. 14), none of the position sensors 1200A-1200D are obscured by the plunger 930. Likewise, when the circuit interrupter 915 is in the fully closed state (FIG. 15), all of the position sensors 1200A-1200D are obscured by the plunger 930. With respect to FIGS. 14 and 15, the plunger 930 sequentially obscures the position sensors 1200A-1200D in a left to right direction when the circuit interrupter 915 transitions from the open state to the closed state. That is, as the circuit interrupter 915 is closed, the plunger 930 first obscures position sensor 1200A, then the plunger 930 obscures position sensor 1200B, then the plunger 930 obscures position sensor 1200C, and then finally the plunger 930 obscures position sensor 1200D. Thus, the controller 1305 determines the closing time of the circuit interrupter 915 (e.g., the speed at which the plunger 930 moves through actuator 910) based on a difference between the time at which a first one of the position sensors 1200 (e.g., sensor 1200A) is obscured and the time at which a second one of the position sensors 1200 (e.g., sensor 1200D) is obscured.

Figure 16:
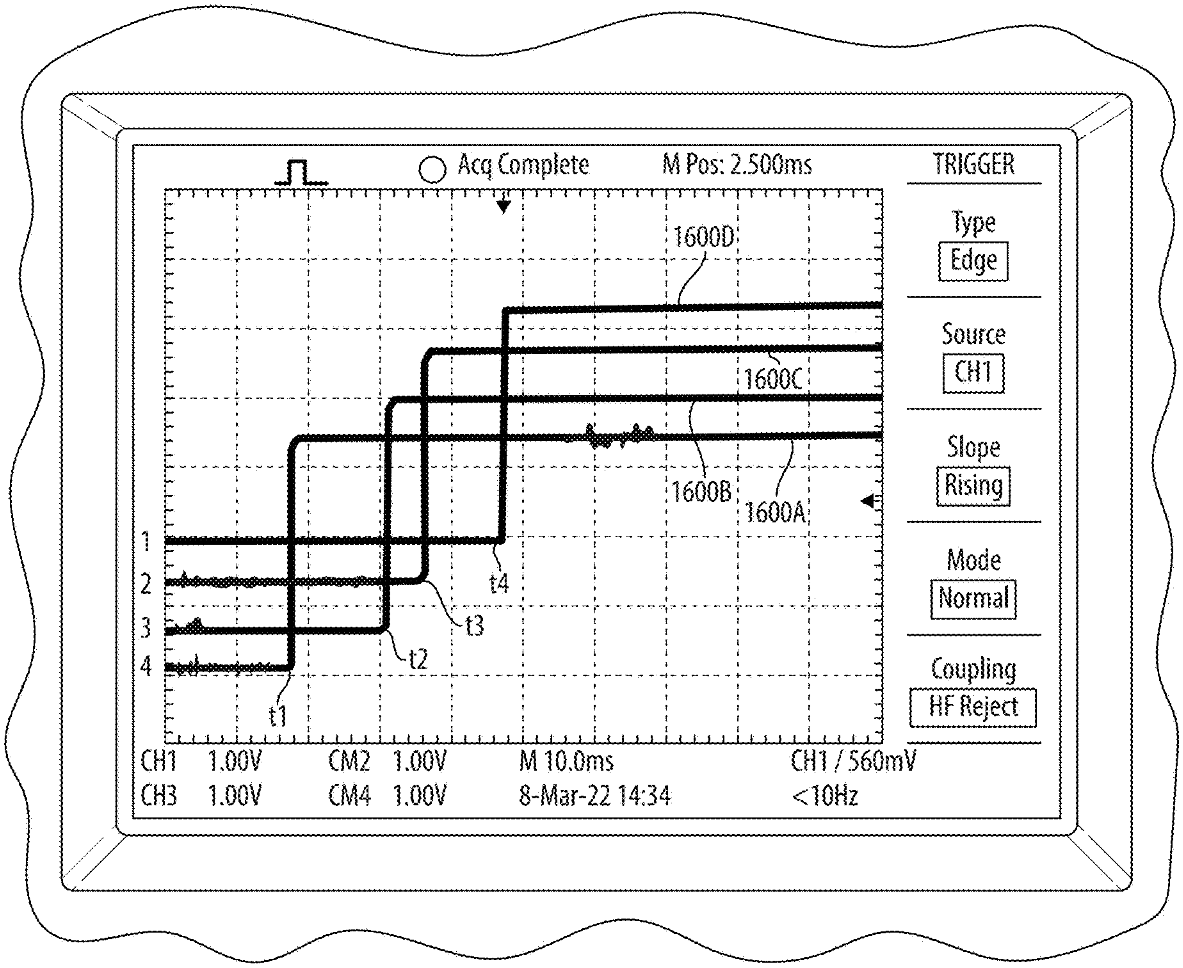
FIG. 16 is a graph illustrating signals generated by the sensor board of FIG. 12, according to some aspects.

FIG. 16 is a graph that illustrates signals 1600A-1600D, which are respectively generated by the position sensors 1200A-1200D, when the plunger 930 closes the circuit interrupter 915, in some embodiments. As shown, the first position sensor 1200A becomes obscured by the plunger at a time $t_1$. When the first position sensor 1200A becomes obscured by the plunger 930, the voltage of the signal 1600A generated by the first position sensor 1200A changes from a low value (e.g., 0 volts) to a high value (e.g., 3.5 volts). Thus, the controller 1305 determines the time, $t_1$, at which the first position sensor 1200A becomes obscured by the plunger 930 to be the time at which the voltage value of the signal 1600A changes from a low value to a high value. Likewise, the controller 1305 determines the respective times, $t_2$-$t_4$, at which the position sensors 1200B-1200D become obscured by the plunger 930 to be the respective times at which the voltage values of the signals 1600B-1600D change from low values to high values. Thus, the controller 1305 determines that the second position sensor 1200B becomes obscured by the plunger 930 at time $t_2$, the third position sensor 1200C becomes obscured by the plunger 930 at time $t_3$, and the fourth position sensor 1200D becomes obscured by the plunger 930 at time $t_4$. In the illustrated example, the controller 1305 determines that the amount of time it takes for the circuit interrupter 915 to close based on the difference between times $t_1$ and $t_4$.

Similarly, the controller 1305 is configured to determine the amount of time it takes for the circuit interrupter 915 to move from the closed position (FIG. 15) to the open position (FIG. 14) based on signals generated by the position sensors 1200A-1200D. When the circuit interrupter 915 is in the fully closed state (FIG. 15), all of the position sensors 1200A-1200D are obscured by the plunger 930. Likewise, when the circuit interrupter 915 is in the fully open state (FIG. 14), all of the position sensors 1200A-1200D are obscured by the plunger 930. With respect to FIGS. 14 and 15, the position sensors 1200A-1200D sequentially become unobscured by the plunger 930 in a right to left direction as the plunger 930 opens the circuit interrupter 915. That is, as the circuit interrupter 915 is opened and the plunger 930 moves in a right to left direction, the position sensor 1200D is the first to become unobscured by the plunger 930, the position sensor 1200C is the second to become unobscured by the plunger 930, the position sensor 1200B is the third to become unobscured by the plunger 930, and the position sensor 1200A is the fourth to become unobscured by the plunger 930. Thus, the controller 1305 determines the opening time of the circuit interrupter 915 (e.g., the amount of time it takes for the contacts 920, 925 to separate) to be equal to the difference between the time at which position sensor 1200D becomes unobscured and the time at which position sensor 1200A becomes unobscured.

The controller 1305 determines the respective times at which the position sensors 1200A-1200D become unobscured by the plunger 930 in a similar manner to which the controller 1305 determines the respective times at which the position sensors 1200A-1200D become obscured by the plunger 930. For example, the controller 1305 determines the time at which the position sensor 1200D becomes unobscured by the plunger 930 to be the time at which the voltage of the signal generated by the position sensor 1200D changes from a high value (e.g., 3.5 volts) to a low value (e.g., 0 volts). Similarly, the controller 1305 determines the respective times at which the position sensors 1200A-1200C become unobscured by the plunger 930 to be the respective times at which the voltage values of the respective signals generated by sensors 1200A-1200C change from high values to low values.

The controller 1305 is further configured to determine a velocity at which the plunger 930 moves through the actuator 910 based on the signals generated by the position sensors 1200A-1200D. It should be understood that since the plunger 930 is coupled to the moveable contact 925 by the pushrod 935, the velocity of the plunger 930 is equal to the velocity of the moveable contact 925. In one example, the controller 1305 determines the velocity of the plunger 930 while the circuit interrupter 915 changes from the open state (FIG. 14) to the closed state (FIG. 15) based on signals 1600A-1600D generated by the position sensors 1200A-1200D. Since the respective distances D1-D3 between each of position sensors 1200A-1200D are known values, the controller 1305 determines the velocity of the plunger 930 based on a relationship between the respective distance between two of the position sensors 1200A-1200D (e.g., sensors 1200A and 1200D) and the amount of time it takes the plunger 930 to move between the two of the position sensors 1200A-1200D (e.g., sensors 1200A and 1200D). In some instances, the controller 1305 uses Equation 1 to determine the velocity of the plunger 930 during closing of the circuit interrupter 915.

$$\text{velocity} = \frac{(D1 + D2 + D3)}{t_4 - t_1} \quad \text{Equation 1}$$

The expression (D1+D2+D3) is equal to the lateral distance travelled by the plunger 930 between the first position sensor 1200A and the fourth position sensor 1200D, as shown in FIG. 12. Furthermore, the expression $t_4-t_1$ (which is shown in FIG. 16) is equal to an amount of time it takes for the plunger 930 to move from the position at which the plunger 930 obscures the position sensor 1200A to the position at which the plunger 930 obscures the position sensor 1200D. Although Equation 1 is expressed as the velocity of the plunger 930 as the plunger 930 moves between the position sensors 1200A and 1200D, it should be understood that the controller 1305 may be further configured to determine a velocity of the plunger 930 as it moves between other ones of the position sensors 1200A-1200D.

For example, in some instances, the controller 1305 is further configured to use Equation 2 to determine the velocity of the plunger 930 during closing of the circuit interrupter 915. In Equation 2, D2 is equal to the lateral distance travelled by the plunger 930 between the position sensors 1200B and 1200C, as shown in FIG. 12. Furthermore, the expression $t_3-t_2$ is equal to an amount of time it takes for the plunger 930 to move from the position at which the plunger 930 obscures the position sensor 1200B to the position at which the plunger 930 obscures the position sensor 1200C. Accordingly, Equation 2 provides an expression for the velocity of the plunger 930 as it moves between the position sensors 1200B and 1200C.

$$\text{velocity} = \frac{D2}{t_3 - t_2} \qquad \text{Equation 2}$$

In some instances, the controller 1305 is further configured to determine the velocity of the plunger 930 as it moves between other position sensors 1200A-1200D. For example, in some instances, the controller 1305 is configured to determine the velocity of the plunger 930 as it moves between the position sensors 1200A and 1200B or the velocity of the plunger 930 as it moves between the position sensors 1200C and 1200D. Furthermore, it should be understood that the controller 1305 is configured to determine the velocity of plunger 930 during opening of the circuit interrupter 915. For example, the controller 1305 uses an equation similar to Equations 1 and 2 to determine the velocity of plunger 930 during opening of the circuit interrupter 915. Equation 3 below provides a general expression for determining the velocity of plunger 930 when the plunger 930 moves a distance, D, for an amount of time, t. In some instances, the controller 1305 uses Equation 3 to determine the velocity of plunger 930.

$$\text{velocity} = \frac{D}{t} \qquad \text{Equation 3}$$

Figure 17:
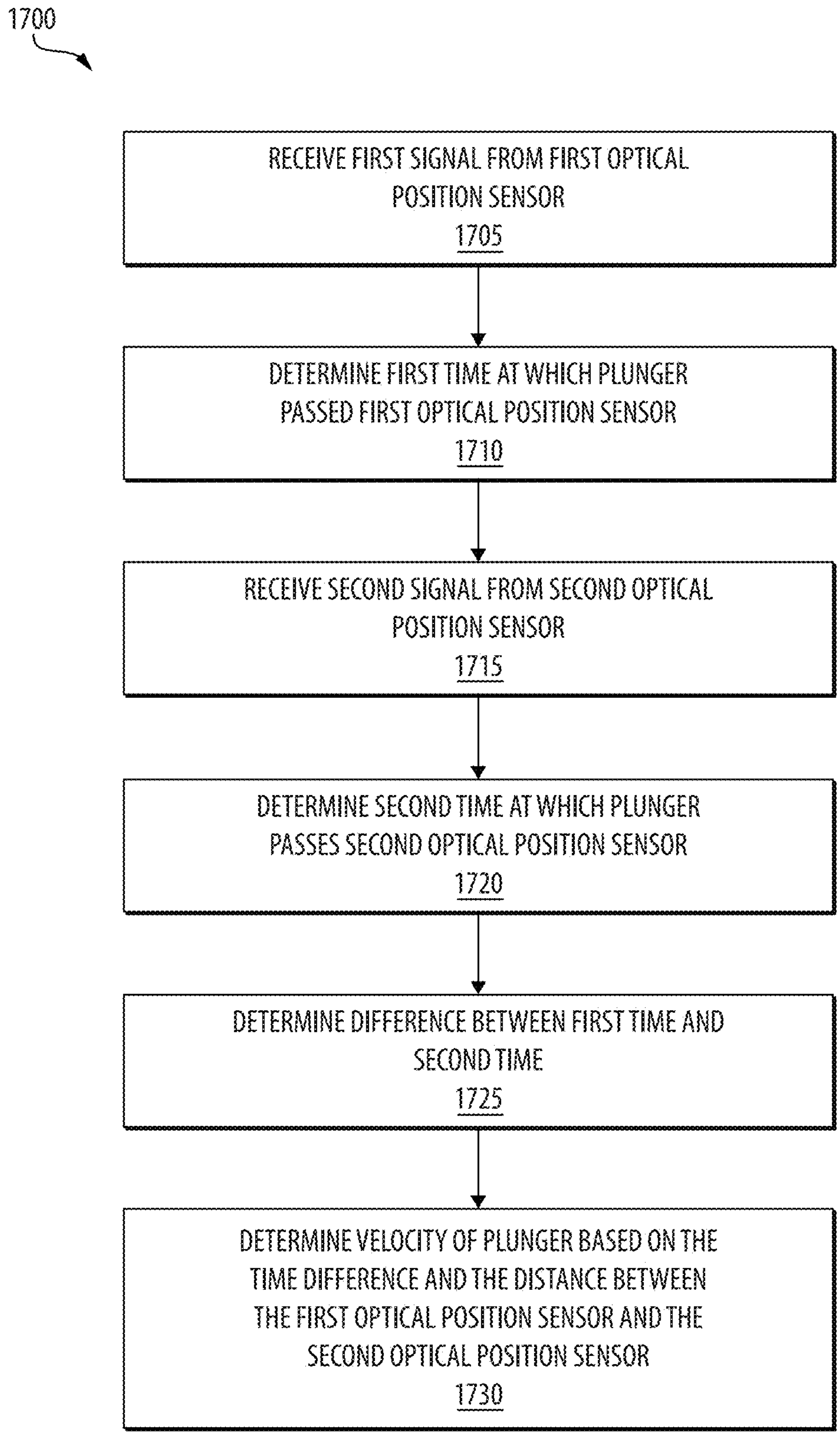
FIG. 17 is a block diagram of a method for determining a velocity of the electromagnetic actuator of FIG. 11, according to some aspects.

FIG. 17 illustrates one example method 1700 of determining the velocity of plunger 930 during opening and/or closing of the circuit interrupter 915. The method 1700 is described as being executed in part by the controller 1305. However, in some examples, some aspects of the method 1700 are performed the position sensors 1200A-1200D, the electronic processor 1320 included in the controller 1305, and/or the memory 1325 included in the controller 1305. In other examples, some aspects of the method 1700 are performed by an external device (e.g., a smartphone or computer) that is communicatively coupled to the controller 1305.

At block 1705, the controller 1305 receives a first signal from a first position sensor 1200. At block 1710, the controller 1305 determines a first time at which the plunger 930 moves past the first position sensor 1200 based on a change in voltage of the first signal. In a first example, the controller 1305 receives the first signal from the first position sensor 1200 while the circuit interrupter 915 is closing. In such an example, the controller 1305 determines the first time at which the plunger 930 moves past, or obscures, the first position sensor 1200 to be the time at which the voltage of the first signal received from the first position sensor 1200 changes from a low value to a high value (e.g., increases by 3.5 volts). In a second example, the controller 1305 receives the first signal from the first position sensor 1200 while the circuit interrupter 915 is opening. In such an example, the controller 1305 determines the first time at which the plunger 930 moves past, or unobscures, the first position sensor 1200 to be the time at which the voltage of the first signal received from the first position sensor 1200 changes from a high value to a low value (e.g., decreases by 3.5 volts).

At block 1715, the controller 1305 receives a second signal from a second position sensor 1200. At block 1720, the controller 1305 determines a second time at which the plunger 930 moves past the second position sensor 1200 based on a change in voltage of the second signal. In the first example, the controller 1305 receives the second signal from the second position sensor 1200 while the circuit interrupter 915 is closing. In such an example, the controller 1305 determines the first time at which the plunger 930 moves past, or obscures, the second position sensor 1200 to be the time at which the voltage of the second signal received from the second position sensor 1200 changes from a low value to a high value (e.g., increases by 3.5 volts). In the second example, the controller 1305 receives the first signal from the second position sensor 1200 while the circuit interrupter 915 is opening. In such an example, the controller 1305 determines the second time at which the plunger 930 moves past, or unobscures, the second position sensor 1200 to be the time at which the voltage of the second signal received from the second position sensor 1200 changes from a high value to a low value (e.g., decreases by 3.5 volts).

At block 1725, the controller 1305 determines a difference between the first time and the second time. At block 1730, the controller 1305 determines the velocity of the plunger 930 based on the time difference (e.g., difference between the first time and the second time) and the lateral distance between the first position sensor 1200 and the second position sensor 1200. For example, the controller 1305 uses Equation 3 to determine the velocity of the plunger 930. In such an example, the controller 1305 determines the velocity of the plunger 930 by dividing the lateral distance between the first and second position sensors 1200 by the time difference. The lateral distance between the first and second position sensors 1200 is a known, fixed value. In some instances, the value of lateral distance between the first and second position sensors 1200 is stored in the memory 1325 of the controller 1305.

In some instances, the controller 1305 is further configured to detect an amount of erosion of the contacts 920, 925 included in circuit interrupter 915 based on signals generated by the position sensors 1200A-1200D. Erosion of the contacts 920, 925 results in reduced performance of the recloser 102, and in some instances, renders the recloser 102 inoperable. Accordingly, to prevent further damage to the recloser 102 and/or the power distribution system to which the recloser 102 is connected, it is desirable for the controller 1305 to determine whether the contacts 920, 925 included in the circuit interrupter 915 have eroded by an amount that warrants repair or replacement of the recloser 102.

In a first example, the controller 1305 detects erosion of the contacts 920, 925 by comparing a baseline velocity of the plunger 930 during opening and/or closing of the circuit interrupter 915 to an actual velocity of the plunger 930 during opening and/or closing of the circuit interrupter 915. The baseline velocity of the plunger 930 refers to the velocity of the plunger 930 when the recloser 102 is in a pristine state, such as when the recloser 102 is newly manufactured and not worn down by usage in the field. Accordingly, the value of the baseline velocity of plunger 930 may be determined shortly after construction of the recloser 102. The value of the baseline velocity of the plunger 930 is stored in the memory 1325. In some instances, the baseline velocity of the plunger 930 is determined using sensors that are external to the recloser 102. In some instances, the controller 1305 determines the baseline velocity based on signals generated by the position sensors 1200A-1200D. In such instances, the controller 1305 may use method 1700 to determine the baseline velocity of the plunger 930.

The actual velocity of the plunger 930 refers to the velocity of the plunger 930 during opening and/or closing of the circuit interrupter 915 when the recloser 102 is installed and operating in the power distribution system. For example, the actual velocity of the plunger 930 may be a velocity of the plunger 930 sometime after (e.g., days after, weeks after, months after, years after, etc.) installation of the recloser 102 in the power distribution system. The controller 1305 determines the actual velocity of the plunger 930 based on signals generated by the position sensors 1200A-1200D as described above. For example, the controller 1305 determines the actual velocity of the plunger 930 by using method 1700.

In a first example, the controller 1305 may determine a level of erosion of the contacts 920, 925 by determining a difference between the baseline velocity of the plunger 930 and the actual velocity of the plunger 930. When the difference between the baseline velocity of the plunger 930 and the actual velocity of the plunger 930 exceeds a threshold, the controller 1305 may determine that the contacts 920, 925 have eroded by a particular amount (e.g., an amount of erosion at which operation of the recloser 102 suffers). In some instances, the controller 1305 controls the actuator 910 to open the circuit interrupter 915 in response to determining that the contacts 920, 925 have eroded by the particular amount. In some instances, the controller 1305 transmits, by the communication interface 1315, a message indicative of the contact erosion to an external device in response to determining that the contacts 920, 925 have eroded by the particular amount.

In some instances, a difference between the baseline velocity of the plunger 930 and the actual velocity of the plunger 930 is directly proportional to an amount of erosion experienced by the contacts 920, 925. Accordingly, in such instances, the controller 1305 determines an amount of erosion of the contacts 920, 925 based on the difference between the baseline velocity of plunger 930 and the actual velocity of plunger 930. For example, if the controller 1305 determines that the actual speed of the plunger 930 during opening of the circuit interrupter 915 is 5% less than the baseline velocity of the plunger 930 during opening of the circuit interrupter 915, the controller 1305 determines that the contacts 920, 925 have eroded by 5%. In some instances, the controller 1305 is further configured to determine whether other components of the recloser 102, such as the actuator 910, are damaged based on a comparison between the baseline velocity of plunger 930 and the actual velocity of the plunger 930.

Figure 18:
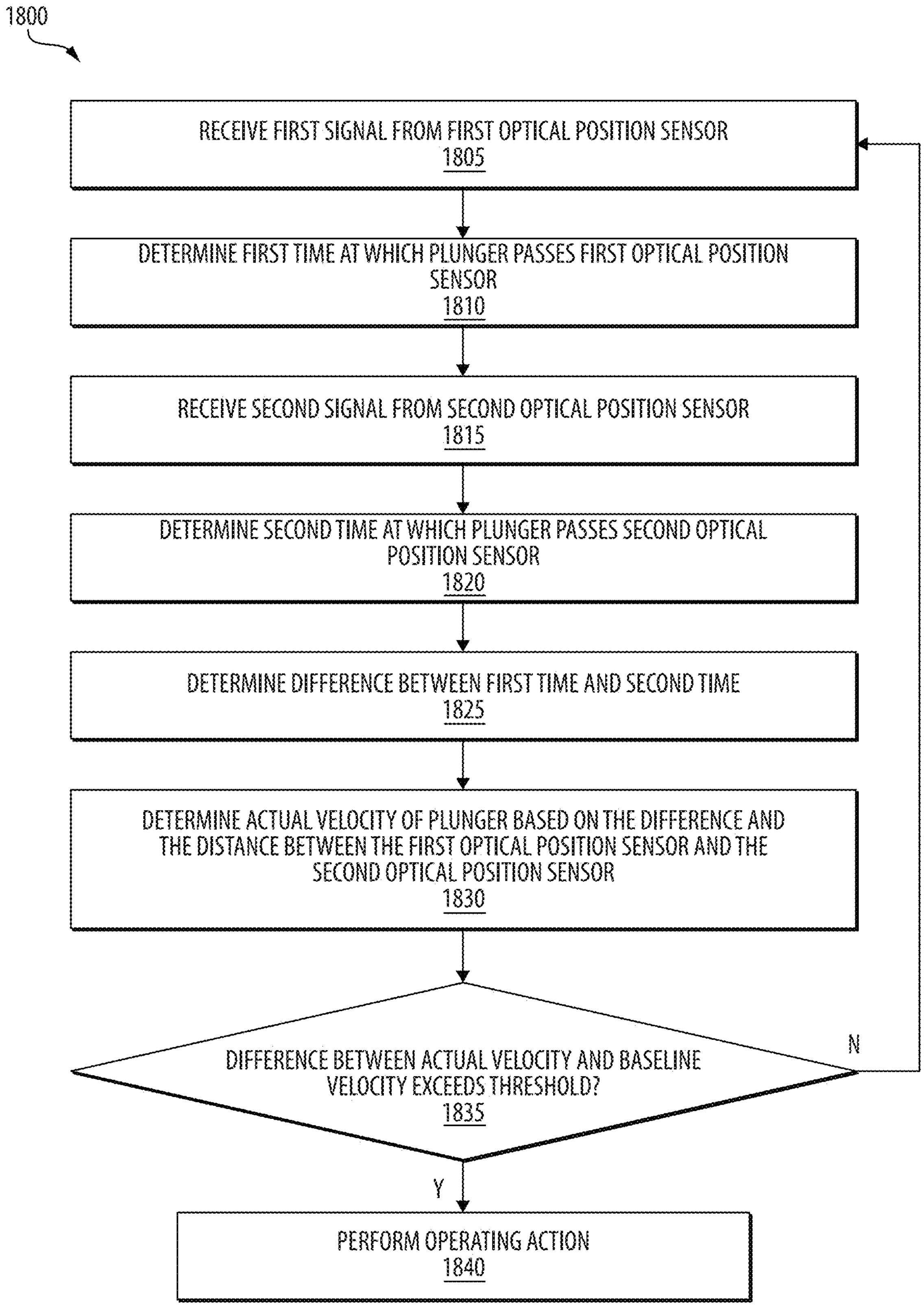
FIG. 18 is a block diagram of a method for determining an amount of erosion to contacts included in the recloser of FIG. 1, according to some aspects.

FIG. 18 illustrates a first example method 1800 of determining whether the contacts 920, 925 included in circuit interrupter 915 have eroded by a particular amount. The method 1800 is described as being executed in part by the controller 1305. However, in some examples, some aspects of the method 1800 are performed using the position sensors 1200A-1200D, the electronic processor 1320 included in the controller 1305, and/or the memory 1325 included in the controller 1305. In other examples, some aspects of the method 1800 are performed by an external device (e.g., a smartphone or computer) that is communicatively coupled to the controller 1305. In addition, the method 1800 is particularly described with respect to detecting contact erosion based on signals received from position sensors 1200B and 1200C. However, in other examples, signals received from other position sensors (e.g., sensors 1200A and/or 1200D) may be used to detect contact erosion.

At block 1805, the controller 1305 receives a first signal from the position sensor 1200C. At block 1810, the controller 1305 determines a first time at which the plunger 930 moves past the position sensor 1200C (for example, based on a change in voltage of the first signal). For example, if the circuit interrupter 915 is opening, the plunger 930 moves past the position sensor 1200C from a position that obscures the position sensor 1200C to a position that does not obscure the position sensor 1200C. In such an example, the controller 1305 determines the first time at which the plunger 930 moves past, or unobscures, the position sensor 1200C to be the time at which the voltage of the first signal received from the position sensor 1200C changes from a high value to a low value (e.g., decreases by 3.5 volts).

At block 1815, the controller 1305 receives a second signal from the position sensor 1200B. At block 1820, the controller 1305 determines a second time at which the plunger 930 moves past the position sensor 1200B (for example, based on a change in voltage of the second signal). For example, if the circuit interrupter 915 is opening, the plunger 930 moves past the position sensor 1200B from a position that obscures the position sensor 1200B to a position that does not obscure the position sensor 1200B. In such an example, the controller 1305 determines the second time at which the plunger 930 moves past, or unobscures, the position sensor 1200B to be the time at which the voltage of the second signal received from the position sensor 1200B changes from a high value to a low value (e.g., decreases by 3.5 volts).

At block 1825, the controller 1305 determines a difference between the first time and the second time. At block 1830, the controller 1305 determines the actual velocity of the plunger 930 moving between the position sensors 1200C, 1200B based on the difference between the first time and the second time and the lateral distance between position sensors 1200C, 1200B (e.g., distance D2 shown in FIG. 12). For example, the controller 1305 uses Equation 3 to determine the actual velocity of the plunger 930. At block 1835, the controller 1305 determines whether a difference between the actual velocity of the plunger 930, which was determined at block 1830, and the baseline velocity of the plunger 930, which is stored in memory 1325, exceeds a threshold. When the difference exceeds the threshold, the controller 1305 determines that the contacts 920, 925 have eroded by a particular amount and performs an operating action (block 1840). In some instances, the operating action includes the controller 1305 transmitting a message indicative of the contact erosion to an external device. In some instances, the operating action includes the controller 1305 opening, by the actuator 910, the circuit interrupter 915.

In a second example, the controller 1305 detects erosion of the contacts 920, 925 based on a difference between a time at which position sensor 1200C becomes obscured by the plunger 930 during closing of the circuit interrupter 915 and a time at which current begins to flow through the moveable contact 925. When a pristine, or newly manufactured, recloser 102 moves from an open state to a closed state, current begins to flow from the stationary contact 920 to the moveable contact 925 at approximately the same time the plunger 930 moves past and obscures a particular position sensor (for example, position sensor 1200C). Thus, the difference between a time at which the particular position sensor (for example, position sensor 1200C) becomes obscured by the plunger 930 during closing of the pristine recloser 102 (e.g., a recloser 102 in which the contacts 920, 925 are not eroded) and a time at which current begins to flow through the contacts 920, 925 should be approximately zero.

However, as the contacts 920, 925 included in the recloser 102 become eroded over time, the difference between a time at which the particular position sensor (for example, position sensor 1200C) may become obscured by the plunger 930 during closing of the recloser 102 and the time at which current begins to flow through the contacts 920, 925 increases. That is, when the contacts 920, 925 have become eroded by a particular amount (e.g., 5%), a delay between the time at which the plunger 930 obscures the particular position sensor (for example, position sensor 1200C) and the time at which current begins to flow through the contacts 920, 925 will occur. For example, for an instance in which the contacts 920, 925 have eroded by a particular amount (e.g., 5%), current begins to flow through the contacts 920, 925 at a particular time after (e.g., 1 millisecond after) the time at which the plunger 930 obscures the particular position sensor (for example, position sensor 1200C). Accordingly, the controller 1305 is operable to determine whether the contacts 920, 925 have eroded by a particular amount (e.g., 5%) based on a detected difference between the time at which plunger 930 obscures the particular position sensor (for example, position sensor 1200C) during closing of the circuit interrupter 915 and the time at which current begins to flow through the contacts 920, 925.

Figure 19:
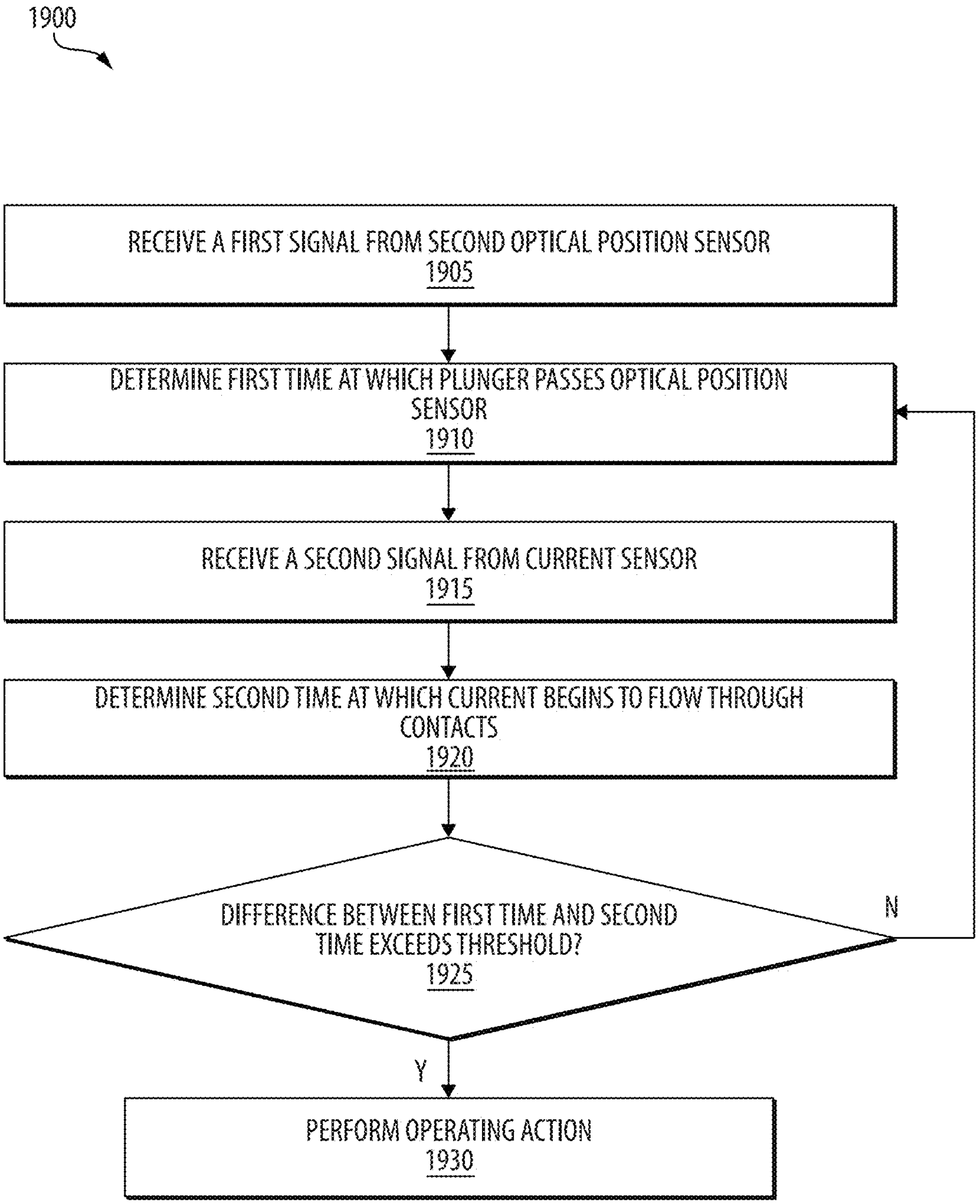
FIG. 19 is a block diagram of a method for determining an amount of erosion to contacts included in the recloser of FIG. 1, according to some aspects.

FIG. 19 illustrates one example method 1900 of determining whether the contacts 920, 925 included in circuit interrupter 915 have eroded by a particular amount. The method 1900 is described as being executed in part by the controller 1305. However, in some examples, some aspects of the method 1900 are performed the position sensors 1200A-1200D, the electronic processor 1320 included in the controller 1305, and/or the memory 1325 included in the controller 1305. In other examples, some aspects of the method 1900 are performed by an external device (e.g., a smartphone or computer) that is communicatively coupled to the controller 1305. In addition, the method 1900 is particularly described with respect to detecting contact erosion based on signals received from a particular position sensor (for example, position sensor 1200C). However, in other examples, signals received from other position sensors (e.g., sensors 1200A, 1200B, and/or 1200D) may be used to detect contact erosion.

At block 1905, the controller 1305 receives a first signal from a position sensor (for example, position sensor 1200C). At block 1910, the controller 1305 determines a first time at which the plunger 930 moves past the position sensor (for example, position sensor 1200C) based on a change in voltage of the first signal. For example, when the circuit interrupter 915 is closing, the controller 1305 determines the first time at which the plunger 930 moves past, or obscures, the position sensor (for example, position sensor 1200C) to be the time at which the voltage of the first signal received from the position sensor (for example, position sensor 1200C) changes from a low value to a high value (e.g., increases by 3.5 volts).

At block 1915, the controller 1305 receives a second signal from current sensor configured to sense a current flowing through the contacts 920, 925. The current sensor is, for example, included in the one or more sensors 1310. At block 1920, the controller 1305 determines a second time at which current begins to flow through the contacts 920, 925 included in the circuit interrupter 915 based on the second signal. For example, the controller 1305 determines the second time at which current begins to flow through the contacts 920, 925 to be the time at which a value of the second signal increases. At block 1925, the controller determines whether the difference between the first time and the second time exceeds a threshold (e.g., 0.1 milliseconds). When the difference between the first time and the second time does exceed the threshold, the controller 1305 determines that the contacts 920, 925 have eroded by a particular amount (e.g., 5%) and performs an operating action (block 1930). In some instances, the operating action includes the controller 1305 transmitting a message indicative of the contact erosion to an external device. In some instances, the operating action includes the controller 1305 opening, by the actuator 910, the circuit interrupter 915.

External Indicator

Figure 20:
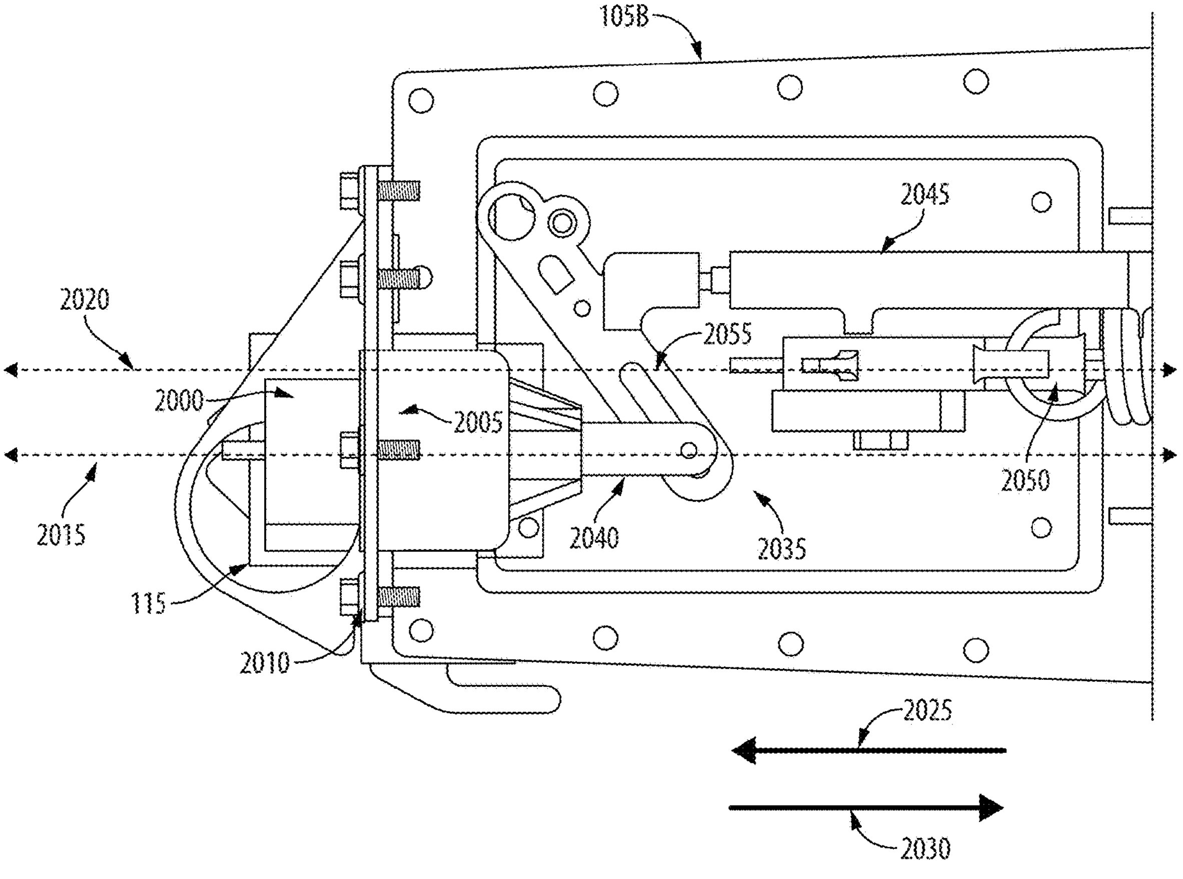
FIG. 20 illustrates a side view of the recloser of FIG. 1 in which an external indicator indicates that the recloser of FIG. 1 is closed, according to some aspects.

As described above, the recloser 102 further includes an external indicator 115 that extends from the lower housing portion 105B of the recloser 102. The external indicator 115 is configured to indicate whether the recloser 102 is closed (e.g., the circuit interrupter 915 is closed and the recloser 102 is energized) or open (e.g., the circuit interrupter 915 is open and the recloser 102 is not energized). FIG. 20 illustrates a side view of the recloser 102 in which a portion of the lower housing portion 105B is removed to expose the components included in the external indicator 115, according to some embodiments. In the illustrated example of FIG. 20, the recloser 102 is in a closed state. Thus, in the illustrated example of FIG. 20, the external indicator 115 is positioned, or oriented, to indicate that the recloser 102 is closed and energized.

The external indicator 115 includes a first, or stationary, display portion 2000 and a second, or moveable, display portion 2005. The stationary display portion 2000 is fixed relative to the lower housing portion 105B such that the stationary display portion 2000 permanently extends outward from a bottom surface 2010 of the lower housing portion 105B. As shown in FIG. 20, only the stationary display portion 2000 extends from the bottom surface 2010 of the lower housing portion 105B to indicate that the recloser 102 is energized. Thus, an operator looking at the recloser 102 knows that the recloser 102 is energized when only the stationary display portion 2000 is visible and extending outward from the bottom surface 2010.

In some instances, the stationary display portion 2000 is formed of a first color (e.g., red). In such instances, an operator looking at the recloser 102 knows that the recloser 102 is energized when the external indicator 115 displays the first color of the stationary display portion 2000. In some instances, the stationary display portion 2000 includes a pattern, text, a symbol, and/or a combination thereof that indicates the recloser 102 is energized to an operator looking at the recloser 102. In the illustrated example, the stationary display portion 2000 is generally cylindrical shaped. However, it should be understood that in some instances, the stationary display portion 2000 has a different shape. For example, in other instances, the stationary display portion 2000 is semi-spherical, rectangular prism shaped, or has some other type of shape.

Figure 21:
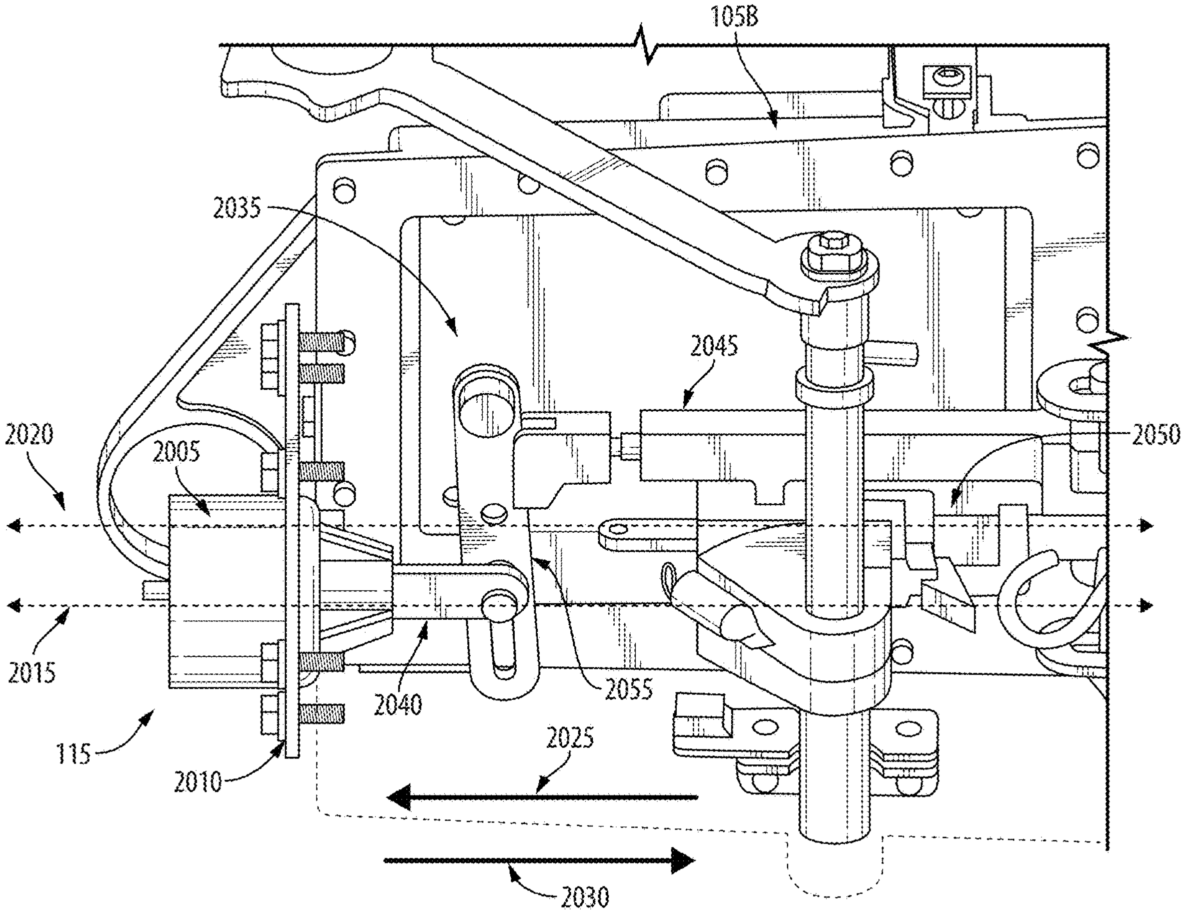
FIG. 21 illustrates a perspective view of the recloser of FIG. 1 in which an external indicator indicates that the recloser of FIG. 1 is open, according to some aspects.

With reference to FIG. 20, the moveable display portion 2005 is retracted into the lower housing portion 105B when the recloser 102 is energized. While the moveable display portion 2005 is retracted into the lower housing portion 105B, the moveable display portion 2005 is not visible to an operator looking at the recloser 102. Accordingly, as described above, only the stationary display portion 2000 is visible to an operator looking at the recloser 102 while the recloser 102 is energized. However, when the recloser 102 transitions to an open state (e.g., the contacts 920, 925 in the circuit interrupter 915 separated to stop conducting current), the moveable display portion 2005 moves such that it extends outward from the bottom surface 2010 of the lower housing portion 105B and obscures (or covers) the stationary display portion 2000 from the view of an operator looking at the recloser 102. Accordingly, as shown in FIG. 21, only the moveable display portion 2005 is visible to an operator when the recloser 102 is open.

In some instances, the moveable display portion 2005 is formed of a second color (e.g., green) that is different that the color of the stationary display portion 2000. In such instances, an operator looking at the recloser 102 knows that the recloser 102 is open and not energized when the external indicator 115 displays the second color of the moveable display portion 2005. In some instances, the moveable display portion 2005 includes a pattern, text, a symbol, and/or a combination thereof that indicates the recloser 102 is open and not energized to an operator looking at the recloser 102. In the illustrated example, the stationary display portion 2000 has a hollow cylindrical shape, such that moveable display portion 2005 surrounds and encloses the cylindrically shaped stationary display portion 2000 when the recloser 102 is open and the moveable display portion 2005 is extended outward from the lower housing portion 105B (FIG. 21). However, it should be understood that in some instances, the moveable display portion 2005 has a different shape. For example, in instances in which the stationary display portion 2000 has a non-cylindrical shape (e.g., a semi-spherical shape, rectangular prism shape, etc.), the moveable display portion 2005 is formed to have a corresponding shape that will obscure the stationary display portion 2000 from when the recloser 102 is open.

In operation, the moveable display portion 2005 moves linearly to extend out of and retract into the lower housing portion 105B along a first axis 2015. The first axis 2015 is parallel to a second axis 2020 along which the plunger 930 linearly moves to open and close the circuit interrupter 915. The movable display portion 2005 is mechanically coupled to the plunger 930 such that the moveable display portion 2005 is mechanically driven in line with the plunger 930. Thus, when the plunger 930 moves in a first, or opening, direction 2025 to open the circuit interrupter 915, the moveable display portion 2005 also moves in the opening direction 2025 such that it extends outward from the lower housing portion 105B (FIG. 21). Similarly, when the plunger 930 moves in a second, or closing, direction 2030 to close the circuit interrupter 915, the moveable display portion 2005 also moves in the closing direction 2030 such that it retracts into the lower housing portion 105B (FIG. 20).

The moveable display portion 2005 is mechanically coupled to the plunger 930 by an indicator linkage assembly 2035. In the illustrated embodiment, the indicator linkage assembly 2035 includes a first rod 2040, a second rod 2045, a first mechanical link 2050, and a second mechanical link 2055. The first rod 2040 is mechanically coupled to the moveable display portion 2005 such that the first rod 2040 extends outward from a surface of the moveable display portion 2005 in the closing direction 2030. As further shown, the first rod 2040 extends into the lower housing portion 105B along the first axis 2015. The second rod 2045 is mechanically coupled to the plunger 930 by the first mechanical link 2050 (FIGS. 22 and 23) such that when the plunger 930 moves to open and/or close the circuit interrupter 915, the first mechanical link 2050 forces the second rod 2045 to correspondingly move in the opening and closing directions 2025, 2030. The second mechanical link 2055 is pivotably coupled between respective ends of the first and second rods 2040, 2045 such that movement of the second rod 2045 causes a corresponding movement of the first rod 2040.

For example, when the plunger 930 opens the circuit interrupter 915 and forces the second rod 2045 to move in the opening direction 2025, the end of the second mechanical link 2055 that is coupled to the first rod 2040 pivots in the opening direction 2025. This pivoting motion of the second mechanical link 2055 in the opening direction 2025 forces the first rod 2040 to move in the opening direction 2025, thereby causing the moveable display portion 2005 to extend out of the lower housing portion 105B. Similarly, when the plunger 930 closes the circuit interrupter 915 and forces the second rod 2045 to move in the closing direction 2030, the end of the second mechanical link 2055 that is coupled to the first rod 2040 pivots in the closing direction 2030. This pivoting motion of the second mechanical link 205*t* in the closing direction 2030 pulls the first rod 2040 in the closing direction 2030, thereby causing the moveable display portion 2005 to retract into the lower housing portion 105B.

In the illustrated example, the second mechanical link 2055 is configured to amplify the length of distance travelled by the moveable display portion 2005 relative to the length distance travelled by the plunger 930 during opening and/or closing of the circuit interrupter 915. That is, when the plunger 930 travels a first distance to open and/or close the circuit interrupter 915, the second mechanical link 2055 causes the moveable display portion 2005 to travel a second distance that is greater than the first distance traveled by the plunger 930.

Figure 22:
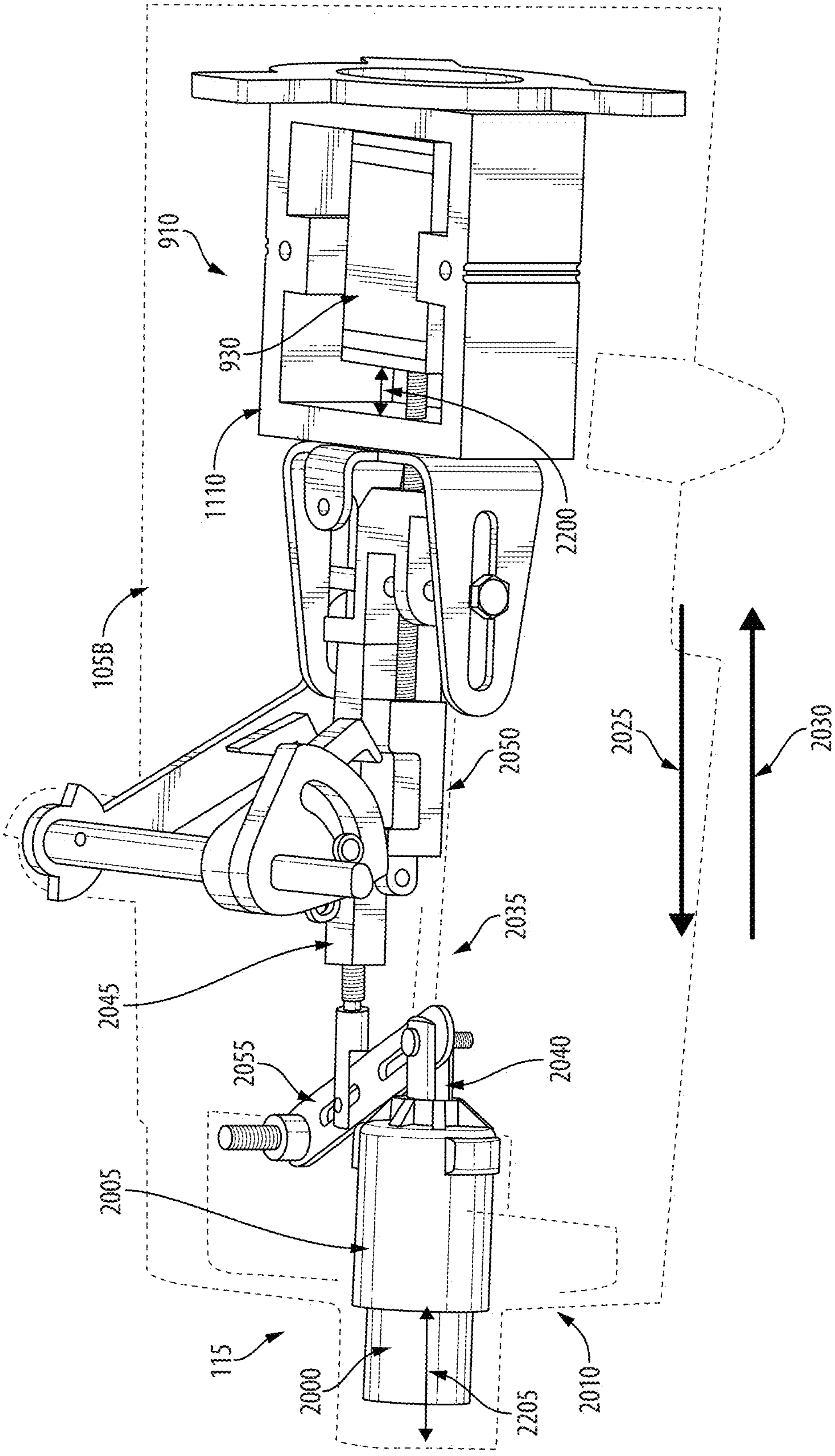
FIG. 22 illustrates a perspective view of the recloser of FIG. 1 in which an external indicator indicates that the recloser of FIG. 1 is closed, according to some aspects.
Figure 23:
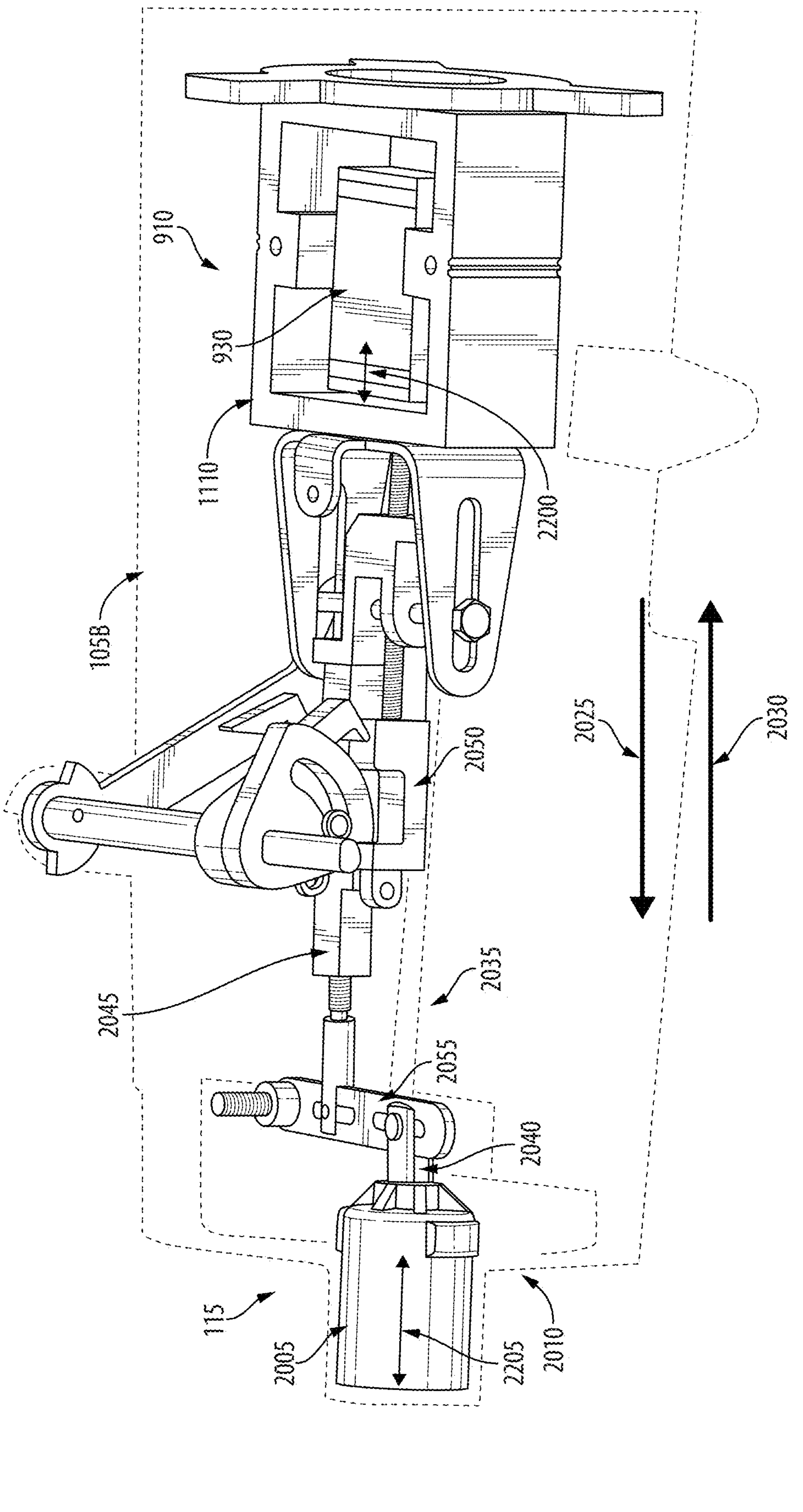
FIG. 23 illustrates a perspective view of the recloser of FIG. 1 in which an external indicator indicates that the recloser of FIG. 1 is open, according to some aspects.

FIG. 22 illustrates a perspective view of the recloser 102 in which the recloser 102 is in a closed state, according to some embodiments. When the recloser 102 is in the closed state, the plunger 930 is spaced apart from the rear end (e.g., left end with respect to FIG. 22) of the magnetic frame 1110 of the actuator 910 by a first distance 2200. Furthermore, when the recloser 102 is in the closed state, a bottom surface (e.g., leftmost surface) of the moveable display portion 2005 is approximately flush with the bottom surface 2010 of the lower housing portion 105B. When the recloser changes from the closed state to the open state, as shown in FIG. 23, the plunger 930 travels the first distance 2200 in the opening direction 2025 and the moveable display portion 2005 correspondingly travels a second distance 2205 in the opening direction 2025. Similarly, when the recloser 102 transitions from an open state to a closed state, the plunger 930 travels the first distance 2200 in the closing direction 2030 and the moveable display portion 2005 correspondingly travels the second distance 2205 in the closing direction 2030. As shown, the second distance 2205 travelled by the moveable display portion 2005 during opening and/or closing of the circuit interrupter 915 is greater than the first distance 2200 travelled by the plunger 930 during opening and/or closing of the recloser 102.

In some instances, the second mechanical link 2055 is configured to amplify movement of the moveable display portion 2005 such that the moveable display portion 2005 travels 100% further than (e.g., twice as far as) the plunger 930 during opening and/or closing of the circuit interrupter 915. In some instances, the second mechanical link 2055 is configured to amplify movement of the moveable display portion 2005 such that the moveable display portion 2005 travels 50% percent further than the plunger 930 during opening and/or closing of the circuit interrupter 915. In some instances, the second mechanical link 2055 is configured to amplify movement of the moveable display portion 2005 such that the moveable display portion 2005 travels 200% further than the plunger 930 during opening and/or closing of the recloser 102. In other instances, the moveable display portion 2005 travels further than the plunger 930 by a different linear distance percentage.

In some instances (not illustrated), the indicator linkage assembly 2035 does not include the second mechanical link 2055 pivotably coupled between the first and second rods 2040, 2045. In some instances the first rod 2040 is coupled directly to plunger 930, such that moveable display portion 2005 moves along the same axis as the plunger 930. In such instances, the linear distance travelled by the moveable display portion 2005 is equal to the linear distance travelled by the plunger 930 during opening and/or closing of the circuit interrupter.

Mechanical Open/Close

As described above, the recloser 102 further includes a handle 110 for mechanically opening and/or closing the circuit interrupter 915 included recloser 102. The handle 110 is configured to mechanically open and/or close the circuit interrupter 915 without any assistance from an electrical power source, such as a backup battery or power provided by the distribution system to which the recloser 102 is connected. In particular, rotation of the handle 110 causes the circuit interrupter 915 to open and/or close. For example, with the use of a lineman's tool (e.g., the hot stick 500), a lineman can rotate the handle 110 to drive the circuit interrupter 915 between the open and closed states even when no power is provided to the recloser 102. The recloser 102 has no need for and does not include a backup power source, such as a battery or large capacitor, to facilitate opening and closing of the circuit interrupter 915 using handle 110. Accordingly, the size and complexity of the housing 105 of recloser 102 can be reduced in comparison to systems that do include a backup power source for opening and closing, as the housing 105 does not accommodate a backup power source or any of the would be associated wiring and shielding.

Figure 24:
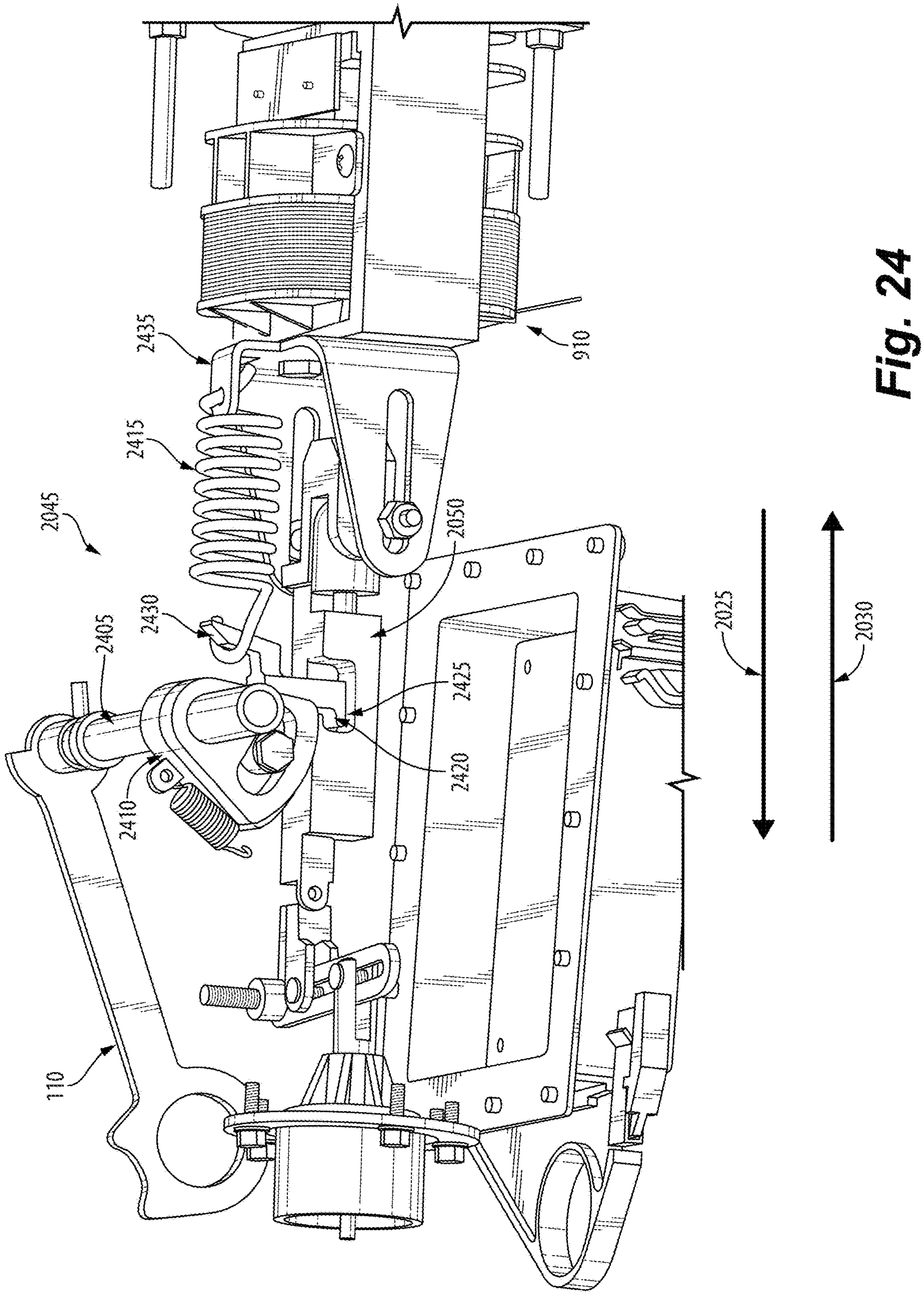
FIG. 24 illustrates a perspective view of a linkage assembly for mechanically opening and closing the recloser of FIG. 1, according to some aspects.
Figure 25:
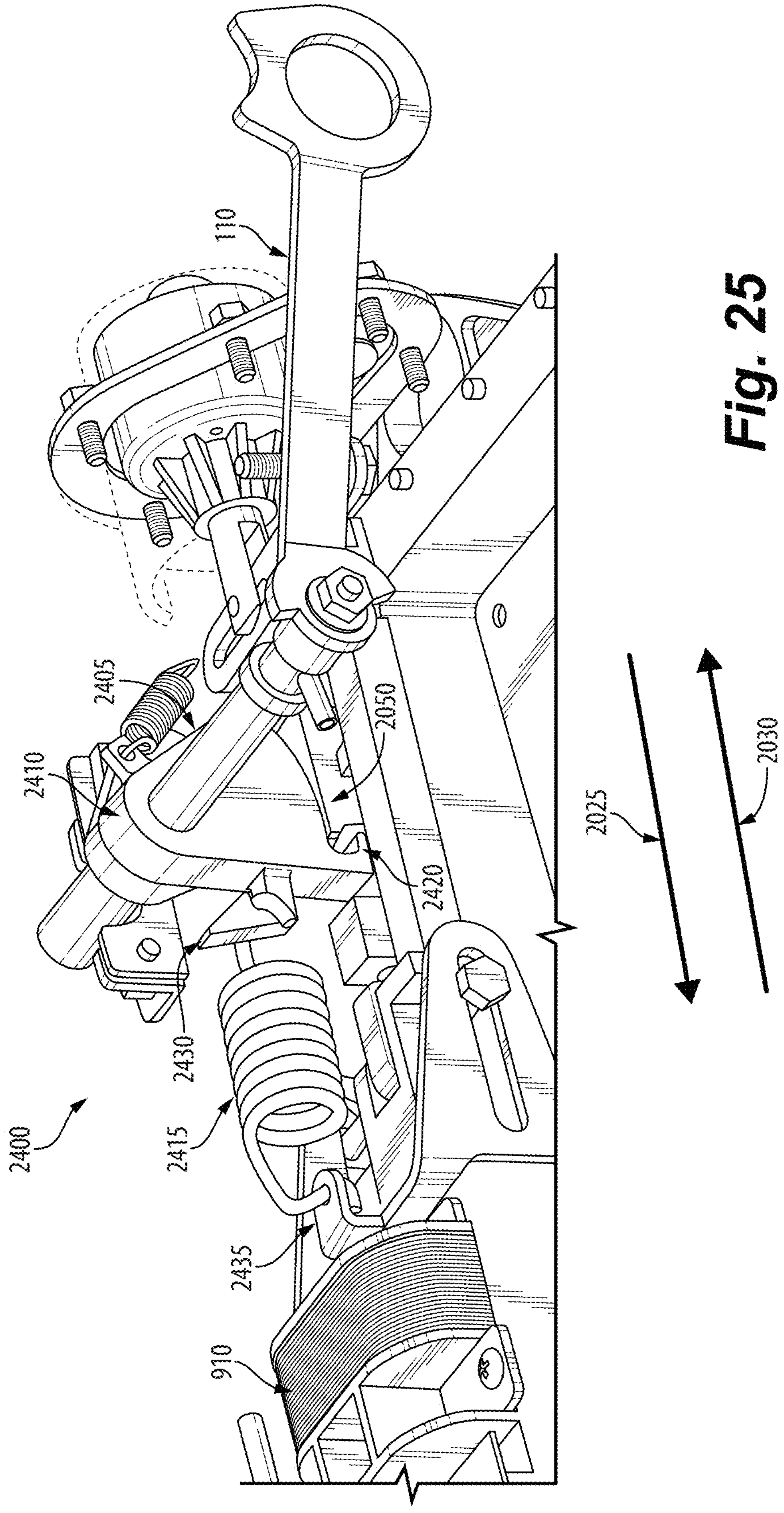
FIG. 25 illustrates a perspective view of a linkage assembly for mechanically opening and closing the recloser of FIG. 1, according to some aspects.
Figure 26:
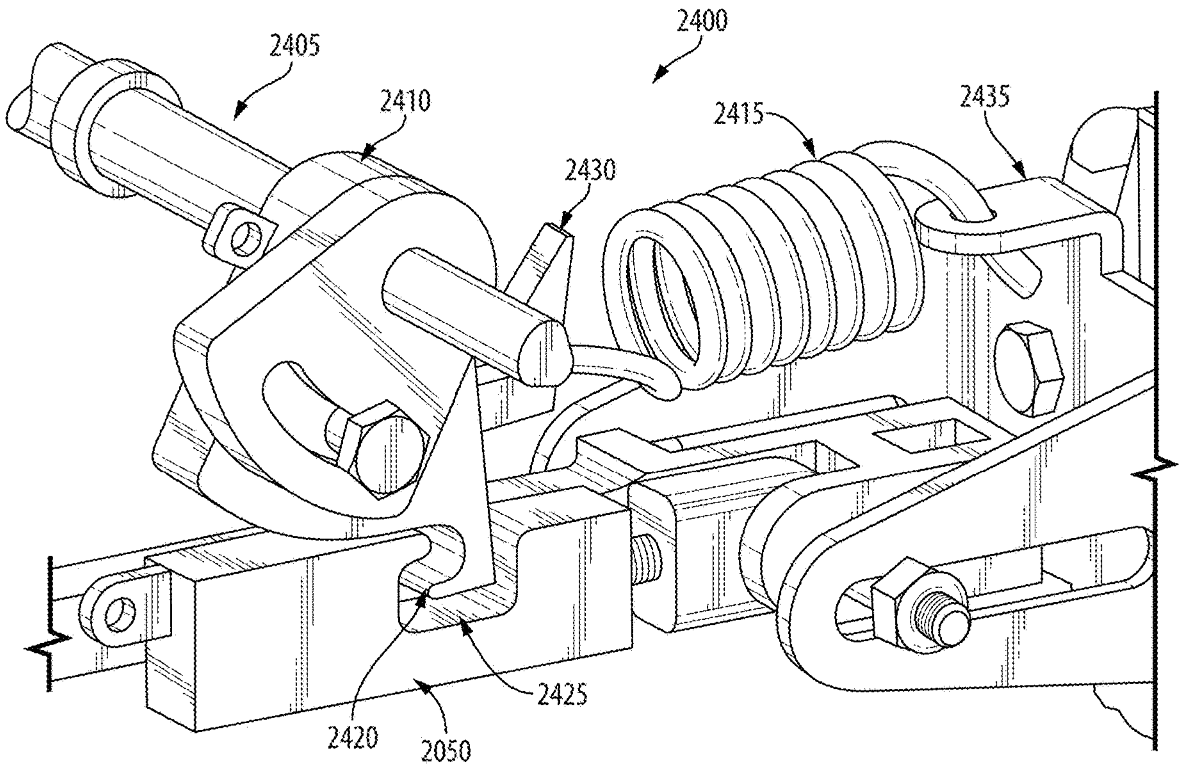
FIG. 26 illustrates a perspective view of a linkage assembly for mechanically opening and closing the recloser of FIG. 1, according to some aspects.
Figure 27:
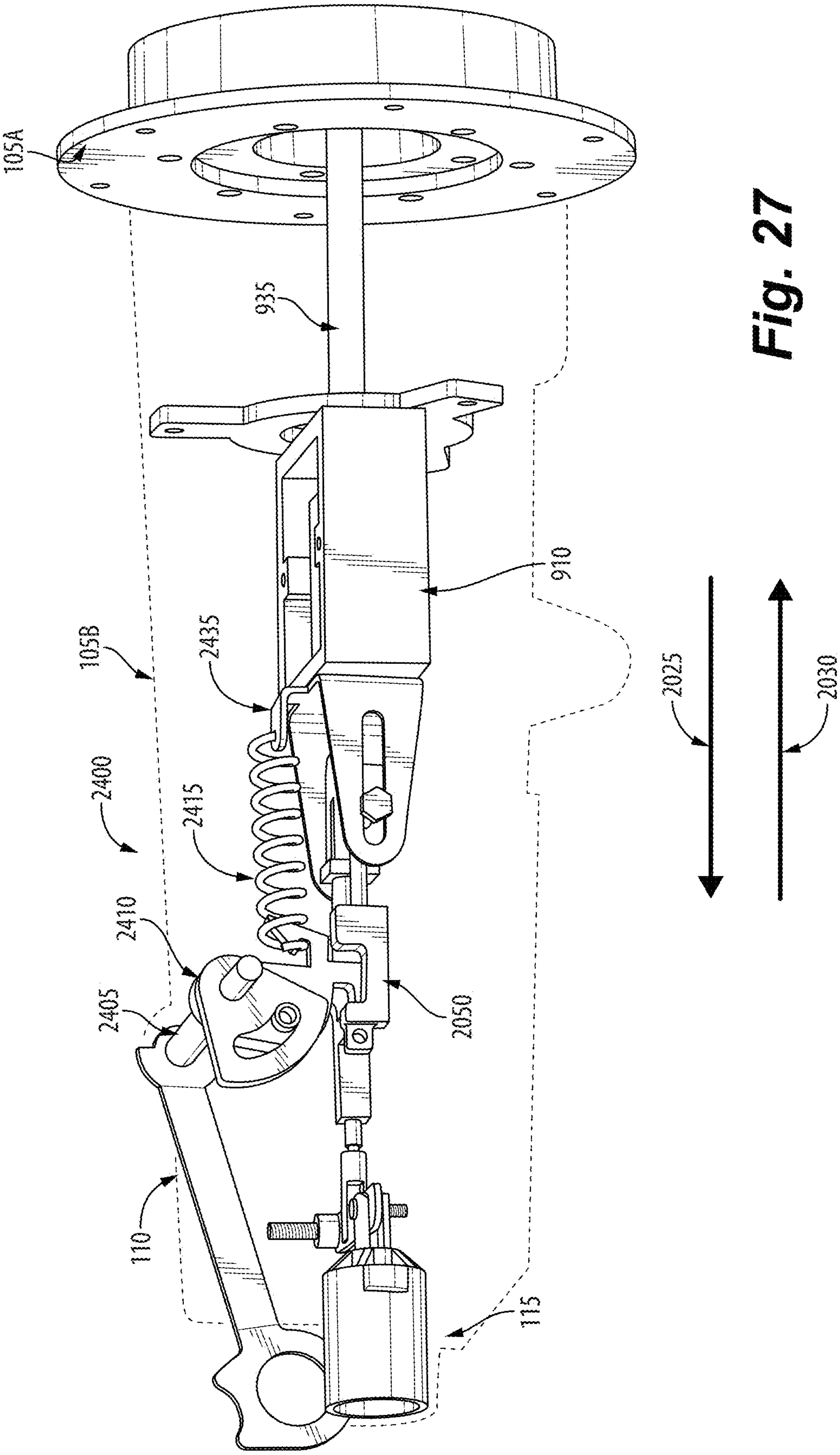
FIG. 27 illustrates a perspective view in which the recloser of FIG. 1 has been mechanically opened, according to some aspects.
Figure 28:
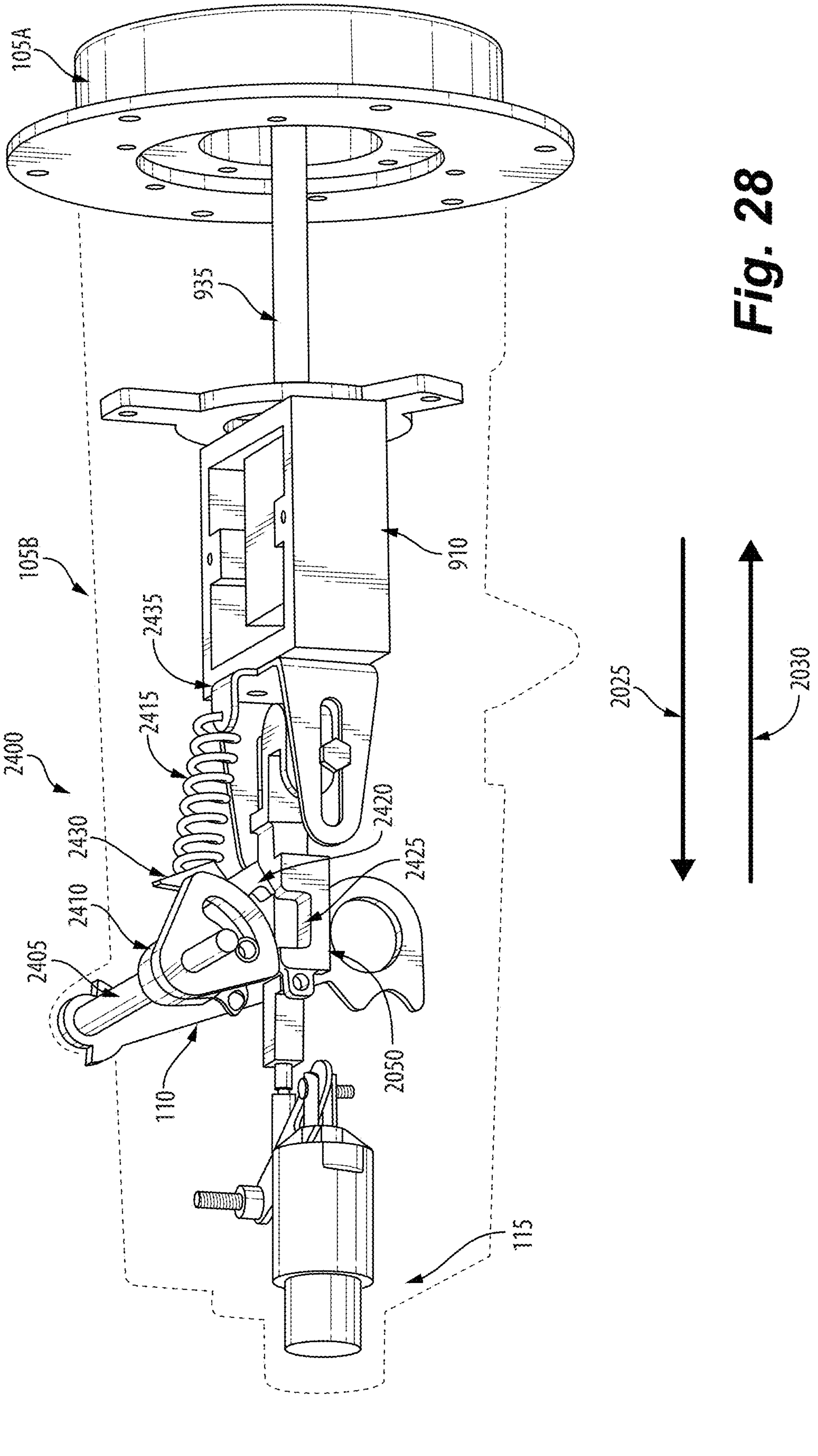
FIG. 28 illustrates a perspective view in which the recloser of FIG. 1 is closed, according to some aspects.

As will be described in more detail below, FIGS. 24-28 illustrate perspective views of an open/close linkage assembly 2400 that mechanically couples the handle 110 to the actuator 910 for opening and closing the circuit interrupter 915, according to some embodiments. In particular, FIGS. 24 and 25 illustrate perspective views of the recloser 102 in which the open/close linkage assembly 2400 holds the recloser 102 in the open state. FIG. 26 illustrates a close-up perspective view of the open/close linkage assembly 2400. FIG. 27 illustrates an alternate perspective view of the recloser 102 in which the recloser 102 has been mechanically opened by the open/close linkage assembly 2400. FIG. 28 illustrates a perspective view of the recloser 102 in which the recloser 102 has been mechanically closed by the open/close linkage assembly 2400.

As shown, the open/close linkage assembly 2400 may include the handle 110, the first mechanical link 2050, a rotatable shaft 2405, a cam 2410, and/or a spring 2415. The rotatable shaft 2405 is coupled between the handle 110 and the cam 2410 such that rotation of the handle 110 causes a corresponding rotation of the cam 2410. For example, when the handle 110 is rotated in a counterclockwise direction, the rotatable shaft 2405 rotates the cam 2410 in the counterclockwise direction. Similarly, when the handle 110 is rotated in the clockwise direction, the rotatable shaft 2405 rotates the cam 2410 in the clockwise direction.

The cam 2410 may include a first protruding member, or hook, 2420 that is configured to engage a notch 2425 formed in the first mechanical link 2050. The cam 2410 may further include a second protruding member, or hook, 2430 that is configured to engage an end of the spring 2415. When the handle 110 is rotated to open the circuit interrupter 915 (e.g., rotated counterclockwise) as shown in FIGS. 24, 25, and 27, the cam 2410 rotates such that the first hook 2420 pulls the first mechanical link 2050 in the opening direction 2025 and the second hook 2430 pulls the spring 2415 in the opening direction 2025. Movement of the first mechanical link 2050 in the opening direction 2025 forces the actuator 910 (e.g., the plunger 930) to pull open, or separate, the contacts 920, 925 included in the circuit interrupter 915. Movement of the spring 2415 in the opening direction 2025 loads the spring 2415, such that the spring 2415 is stretched between the second hook 2430 and a structure 2435 fixed within the lower housing portion 105B.

When the handle 110 is rotated to close the circuit interrupter 915 (e.g., rotated clockwise) as shown in FIG. 28, the cam 2410 rotates such that the first hook 2420 pushes the first mechanical link 2050 in the closing direction 2030 and the spring 2415 pulls the second hook 2430 in the closing direction 2030. This combination of first hook 2420 pushing the first mechanical link 2050 in the closing direction 2030 and the spring 2415 pulling the cam 2410 in the closing direction 2030 forces the circuit interrupter 915 to close shut. As further shown in FIG. 28, the first hook 2420 of the cam 2410 no longer engages and is cleared from interfering with the first mechanical link 2050 after the circuit interrupter 915 has been mechanically closed by the open/close linkage assembly 2400. Thus, when automatic operation of the recloser 102 resumes after the circuit interrupter 915 has been mechanically closed, the cam 2410 will not contact or interfere with operation of the actuator 910 by contacting the first mechanical link 2050.

Thus, embodiments described herein provide, among other things, a compact recloser. Various features and advantages are set forth in the following claims.

What is claimed is:

1. A recloser comprising:

a circuit interrupter including a first contact and a second contact, the second contact movable relative to the first contact between a closed position, which allows current to pass through the circuit interrupter, and an open position, which separates the contacts and prevents current from passing through the circuit interrupter;

an actuator coupled to the circuit interrupter, the actuator including a plunger coupled to the second contact for closing and opening the circuit interrupter;

an external indicator for indicating a condition of the circuit interrupter, the external indicator including a first display portion that indicates the closed position and a second display portion moveable relative to the first display portion and that indicates the open position; and a linkage assembly coupled between the second display portion and the plunger, the linkage assembly forcing the second display portion to extend out of the recloser and obscure the first display portion when the plunger opens the circuit interrupter and forcing the second display portion to retract into the recloser when plunger closes the circuit interrupter, wherein the first display portion is obscured by the second display portion surrounding and enclosing the first display portion.

2. The recloser of claim 1, wherein the second display portion moves along a first axis and the plunger moves along a second axis; and wherein the first axis is parallel to the second axis.

3. The recloser of claim 2, wherein the second display portion travels a first distance along the first axis when the plunger opens the circuit interrupter; and wherein the plunger travels a second distance along the second axis when the plunger opens the circuit interrupter.

4. The recloser of claim 3, wherein the first distance is greater than the second distance.

5. The recloser of claim 1, wherein the linkage assembly includes a mechanical link that amplifies a length of movement of the second display portion relative to the plunger.

6. The recloser of claim 5, wherein the mechanical link is pivotably coupled between the plunger and the second display portion.

7. The recloser of claim 1, wherein the first display portion is cylindrical in shape; and wherein the second display portion surrounds the first display portion when the circuit interrupter is open.

8. The recloser of claim 1, wherein the first display portion is fixed relative to a housing of the recloser.

9. The recloser of claim 1, wherein the first display portion is formed of a first color and the second display portion is formed of a second color.

* * * * *